US012743410B2

(12) United States Patent
Nawathe et al.

(10) Patent No.: US 12,743,410 B2
(45) Date of Patent: Sep. 22, 2026

(54) CHANGE DETECTION AND UPDATES USING PROBABILISTIC DATA STRUCTURES

(71) Applicant: Adobe Inc., San Jose, CA (US)

(72) Inventors: Sandeep Anant Nawathe, Sunnyvale, CA (US); Yeshwanth Vijayakumar, Sunnyvale, CA (US); Antonio Cuevas, Mountain View, CA (US); Akhilesh Vedhera, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 19/011,348

(22) Filed: Jan. 6, 2025

(65) Prior Publication Data

US 2026/0195316 A1 Jul. 9, 2026

(51) Int. Cl.
*G06F 16/23* (2019.01)
*G06F 16/334* (2025.01)
*G06F 21/62* (2013.01)

(52) U.S. Cl.
CPC ...... *G06F 16/2358* (2019.01); *G06F 16/3346* (2019.01); *G06F 21/6245* (2013.01)

(58) Field of Classification Search
CPC ............. G06F 16/2358; G06F 16/3346; G06F 21/6245
See application file for complete search history.

(56) References Cited

U.S. PATENT DOCUMENTS 8,438,184 B1 5/2013 Wang et al.
8,880,880 B2 11/2014 Mao et al.
9,298,934 B1 3/2016 Sang et al.
9,349,132 B2 5/2016 Cronin et al.
9,471,791 B2 10/2016 Fawaz et al.
10,579,808 B2 3/2020 Baldwin et al.
10,579,831 B2 * 3/2020 Rubin .................. G06F 21/645
10,642,994 B1 * 5/2020 Allen .................. H04L 63/0428
10,831,920 B2 11/2020 Luo et al.
10,878,335 B1 12/2020 Waugh
10,943,680 B1 3/2021 Knas et al.
10,963,541 B2 3/2021 Cronin et al.
10,970,393 B1 4/2021 Stiles
11,720,708 B2 * 8/2023 Torbey ................ G06F 21/6254 726/26
11,741,068 B2 8/2023 Sheppard et al.
11,755,545 B2 9/2023 Sheppard et al.
11,854,030 B2 12/2023 Sheppard et al.
11,983,228 B1 5/2024 Swope
(Continued)

OTHER PUBLICATIONS

Kohei Ueda et al., "Change Detection with Probabilistic Models on Persistence Diagrams", IEEE, pp. 1191-1196 (Year: 2022).*
(Continued)

*Primary Examiner* — Jared M Bibbee
(74) *Attorney, Agent, or Firm* — FIG. 1 Patents

(57) ABSTRACT

Change detection and updates using probabilistic data structures are described. In one or more examples, a change is detected to a dataset record that is used as a basis to generate a first sketch as a probabilistic data structure. A second sketch is generated as a probabilistic data structure based on the change to the dataset record. The first sketch is replaced with the second sketch as stored in a database, the database supporting a probabilistic result to a query operation.

19 Claims, 23 Drawing Sheets

(56) References Cited

U.S. PATENT DOCUMENTS

| | | | |
|---|---|---|---|
| 12,314,240 | B1 * | 5/2025 | Opincariu ........... G06F 16/2462 |
| 12,353,586 | B2 | 7/2025 | Langseth et al. |
| 12,401,835 | B2 | 8/2025 | Govindarajan |
| 2014/0278771 | A1 | 9/2014 | Rehman et al. |
| 2014/0280153 | A1 | 9/2014 | Cronin et al. |
| 2014/0280193 | A1 | 9/2014 | Cronin et al. |
| 2015/0178769 | A1 | 6/2015 | Mirisola et al. |
| 2016/0028774 | A1 | 1/2016 | Vahlis et al. |
| 2017/0359363 | A1 | 12/2017 | Thakurta et al. |
| 2018/0039619 | A1 | 2/2018 | Thakurta et al. |
| 2018/0182052 | A1 | 6/2018 | Panagos |
| 2018/0349636 | A1 | 12/2018 | Bhowmick et al. |
| 2020/0401726 | A1 * | 12/2020 | Lim ...................... H04L 9/0643 |
| 2021/0165786 | A1 | 6/2021 | Halstead et al. |
| 2021/0248629 | A1 | 8/2021 | Sullivan et al. |
| 2021/0357403 | A1 | 11/2021 | Dash et al. |
| 2021/0359836 | A1 | 11/2021 | Wright et al. |
| 2022/0012349 | A1 | 1/2022 | Kirkwood et al. |
| 2022/0036390 | A1 | 2/2022 | Sheppard et al. |
| 2022/0292101 | A1 * | 9/2022 | Mai ................... G06F 16/24568 |
| 2023/0004997 | A1 | 1/2023 | Sheppard et al. |
| 2023/0052628 | A1 * | 2/2023 | Wang .................. G06F 21/6245 |
| 2023/0421559 | A1 | 12/2023 | Daskon Herath Mudiyanselage et al. |
| 2024/0005022 | A1 | 1/2024 | Cook et al. |
| 2024/0045866 | A1 | 2/2024 | Bordawekar et al. |
| 2024/0078223 | A1 | 3/2024 | Sheppard et al. |
| 2024/0104228 | A1 | 3/2024 | Clegg |
| 2024/0152954 | A1 | 5/2024 | Bramble |
| 2024/0214385 | A1 * | 6/2024 | Wang .................... H04L 63/104 |
| 2024/0249019 | A1 | 7/2024 | Nouri et al. |
| 2024/0281453 | A1 * | 8/2024 | Tarmazdi .............. G06F 16/152 |
| 2024/0281564 | A1 | 8/2024 | Kairouz et al. |
| 2024/0364361 | A1 | 10/2024 | Yan et al. |
| 2025/0156300 | A1 | 5/2025 | Peng et al. |
| 2025/0209198 | A1 | 6/2025 | Madan et al. |
| 2025/0209199 | A1 | 6/2025 | Madan et al. |
| 2025/0342271 | A1 | 11/2025 | Chen et al. |
| 2026/0003996 | A1 | 1/2026 | Cesar et al. |
| 2026/0099622 | A1 | 4/2026 | Nawathe et al. |
| 2026/0099623 | A1 | 4/2026 | Nawathe et al. |
| 2026/0105177 | A1 | 4/2026 | Nawathe et al. |
| 2026/0134137 | A1 | 5/2026 | Nawathe et al. |
| 2026/0141288 | A1 | 5/2026 | Nawathe et al. |
| 2026/0178767 | A1 | 6/2026 | Nawathe et al. |
| 2026/0178769 | A1 | 6/2026 | Nawathe et al. |

OTHER PUBLICATIONS

Balachander Krishnamurthy et al., "Sketch-based Change Detection: Methods, Evaluation, and Applications", IMC, Oct. 27, 2003, pp. 1-14 (Year: 2003).*

Choi, et al., "Differentially-Private Multi-Party Sketching for Large-Scale Statistics", sciendo, Proceedings on Privacy Enhancing Technologies, 2020 (3):153-174, [retrieved from the internet on Feb. 28, 2025], <https://petsymposium.org/popets/2020/popets-2020-0047.pdf>, 2020, 22 pages.

Dalvi, et al., "Queries and Materialized Views on Probabilistic Databases", Journal of Computer and System Sciences, 77, 2011, pp. 473-490.

Dickens, et al., "Order-Invariant Cardinality Estimators Are Differentially Private", Cornell University, arXiv.org, [retrieved from the internet on Feb. 28, 2025], <https://arxiv.org/pdf/2203.15400>, Feb. 3, 2023, 23 pages.

Github, "Differential Privacy", GitHub, [retrieved from the internet on Feb. 26, 2025], <https://github.com/google/differential-privacy>, 2025, 7 pages.

Ido, et al., "Pursuant to MPEP § 2001.06(b) the applicant brings the following co-pending application to the Examiner's attention:", U.S. Appl. No. 18/672,990, filed May 23, 2024, 68 pages.

MIT, "MIT Probabilistic Computing Project", [retrieved from the internet on Nov. 24, 2024], <http://probcomp.csail.mit.edu/software/bayesdb/>, 2024, 3 pages.

Nawathe, et al., "Pursuant to MPEP § 2001.06(b) the applicant brings the following co-pending application to the Examiner's attention:", U.S. Appl. No. 18/909,584, filed Oct. 8, 2024, 63 pages.

Nawathe, et al., "Pursuant to MPEP § 2001.06(b) the applicant brings the following co-pending application to the Examiner's attention:", U.S. Appl. No. 18/909,530, filed Oct. 8, 2024, 64 pages.

Nawathe, et al., "Pursuant to MPEP § 2001.06(b) the applicant brings the following co-pending application to the Examiner's attention:", U.S. Appl. No. 18/912,872, filed Oct. 11, 2024, 87 pages.

Nawathe, et al., "Pursuant to MPEP § 2001.06(b) the applicant brings the following co-pending application to the Examiner's attention:", U.S. Appl. No. 18/946,686, filed Nov. 13, 2024, 113 pages.

Nawathe, et al., "Pursuant to MPEP § 2001.06(b) the applicant brings the following co-pending application to the Examiner's attention:", U.S. Appl. No. 18/952,628, filed Nov. 19, 2024, 109 pages.

Nawathe, et al., "Pursuant to MPEP § 2001.06(b) the applicant brings the following co-pending application to the Examiner's attention:", U.S. Appl. No. 18/988,202, filed Dec. 19, 2024, 105 pages.

Nawathe, et al., "Pursuant to MPEP § 2001.06(b) the applicant brings the following co-pending application to the Examiner's attention:", U.S. Appl. No. 18/988,635, filed Dec. 19, 2024, 99 pages.

Opendp, "Use Our Tools—OpenDP Library", [retrieved from the internet on Feb. 26, 2025], <https://opendp.org/tools>, 2025, 5 pages.

892 issued in U.S. Appl. No. 18/909,584, mailed Mar. 31, 2026, 2 pages.

Cormode, Graham, "Sketch Techniques for Approximate Query Processing", 2011, 67 pages.

Non-Final Office Action issued in U.S. Appl. No. 18/912,872, mailed May 11, 2026, 13 pages.

Non-Final Office Action issued in U.S. Appl. No. 18/946,686, mailed Apr. 9, 2026, 32 pages.

Non-Final Office Action issued in U.S. Appl. No. 18/988,202, mailed Jun. 17, 2026, 18 pages.

Non-Final Office Action issued in U.S. Appl. No. 18/988,635, mailed May 11, 2026, 34 pages.

Restriction Requirement issued in U.S. Appl. No. 18/909,530, mailed May 5, 2026, 7 pages.

* cited by examiner

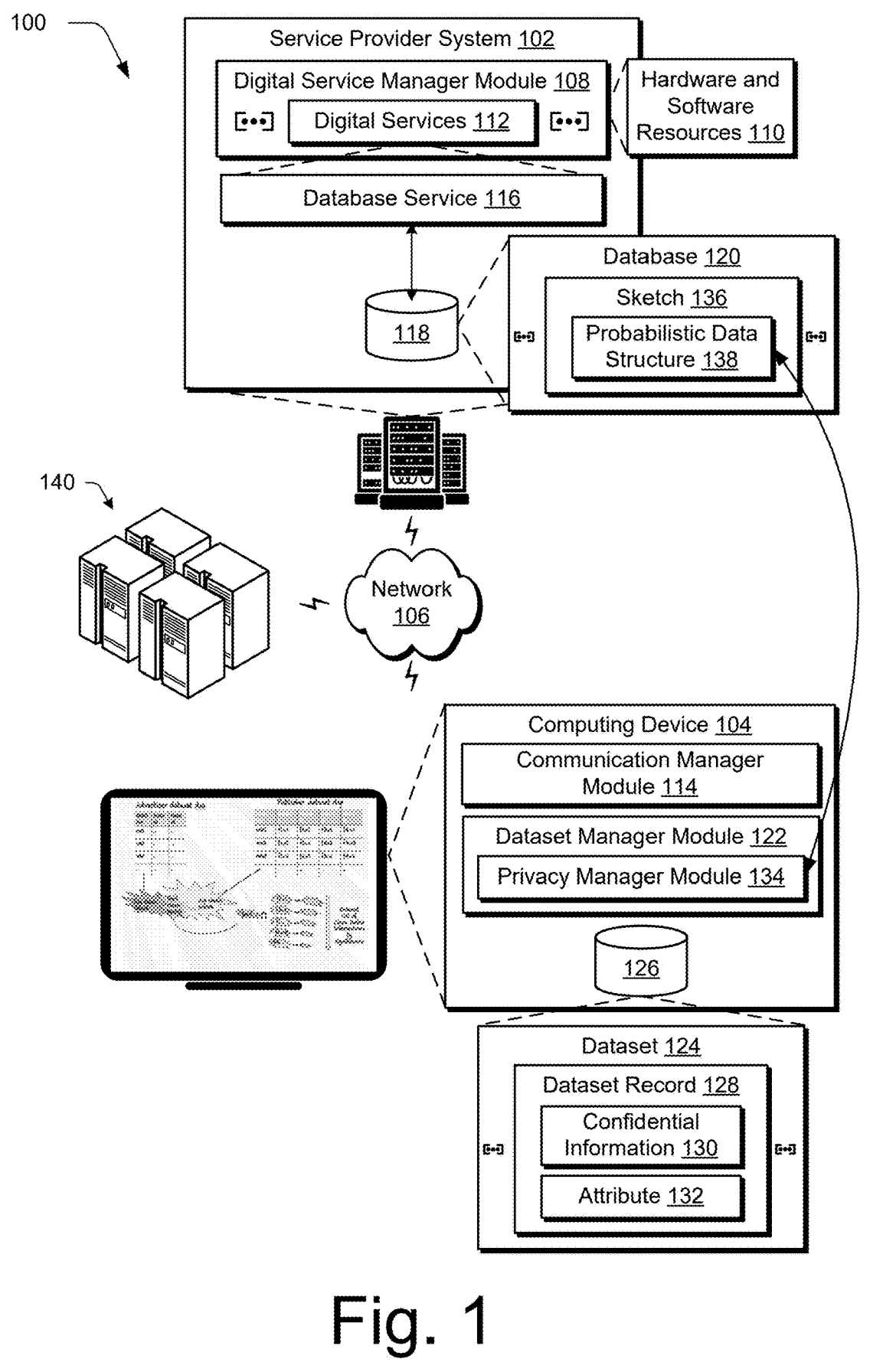

100

Service Provider System 102

Digital Service Manager Module 108

Digital Services 112

Hardware and Software Resources 110

Database Service 116

118

Database 120

Sketch 136

Probabilistic Data Structure 138

140

Network 106

Computing Device 104

Communication Manager Module 114

Dataset Manager Module 122

Privacy Manager Module 134

126

Dataset 124

Dataset Record 128

Confidential Information 130

Attribute 132

Fig. 1

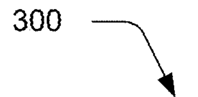
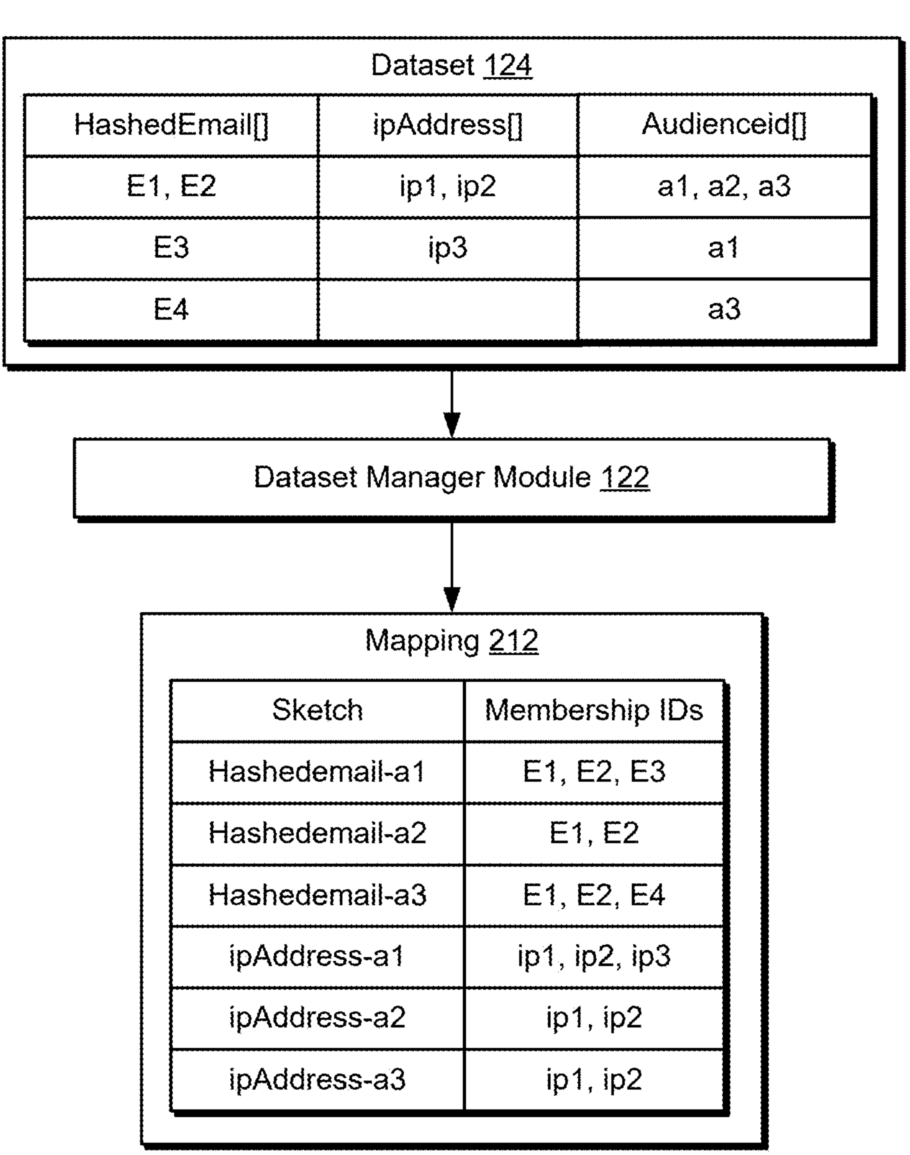
Fig. 3

Dataset Manager Module 122

| Data Type | Sketch Family Generated |
| --- | --- |
| Categorical | Membership querying, Cardinality Estimators, Similarity Checks |
| Categorical Number | Membership querying, Cardinality Estimators, Similarity Checks |
| Continuous Valued | Membership querying, Cardinality Estimators, Similarity Checks, Frequency Estimators, Rank Estimators |

Dataset Manager Module 122

| Hashed Email | age | gender | preferences[] |
| --- | --- | --- | --- |
| E1 | 35 | M | shoes, belts |
| E2 | 24 | F | |
| E3 | 40 | NA | |
| E4 | 22 | F | |

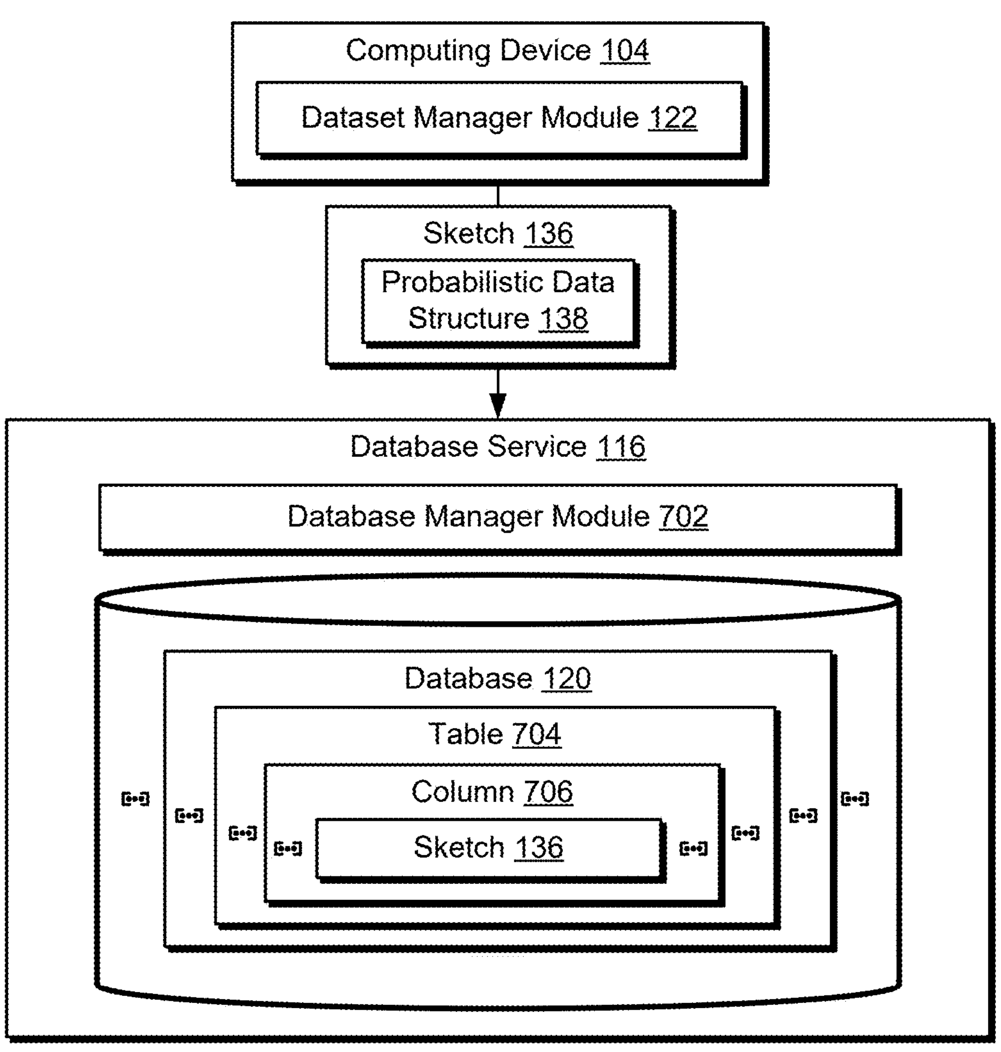
Fig. 7

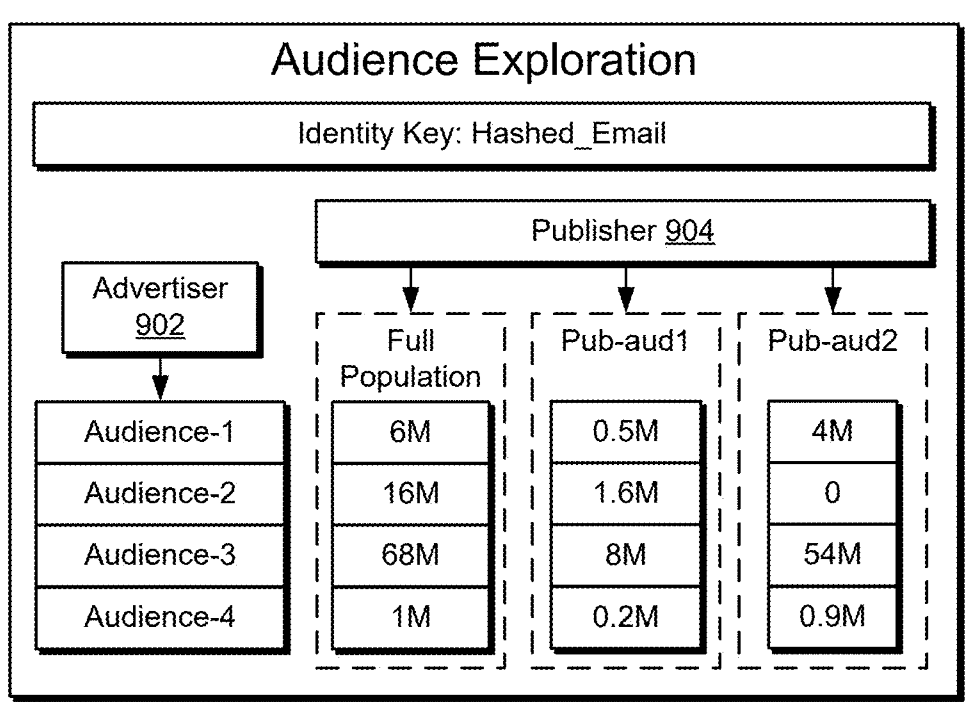
Fig. 9

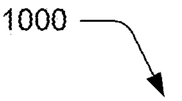
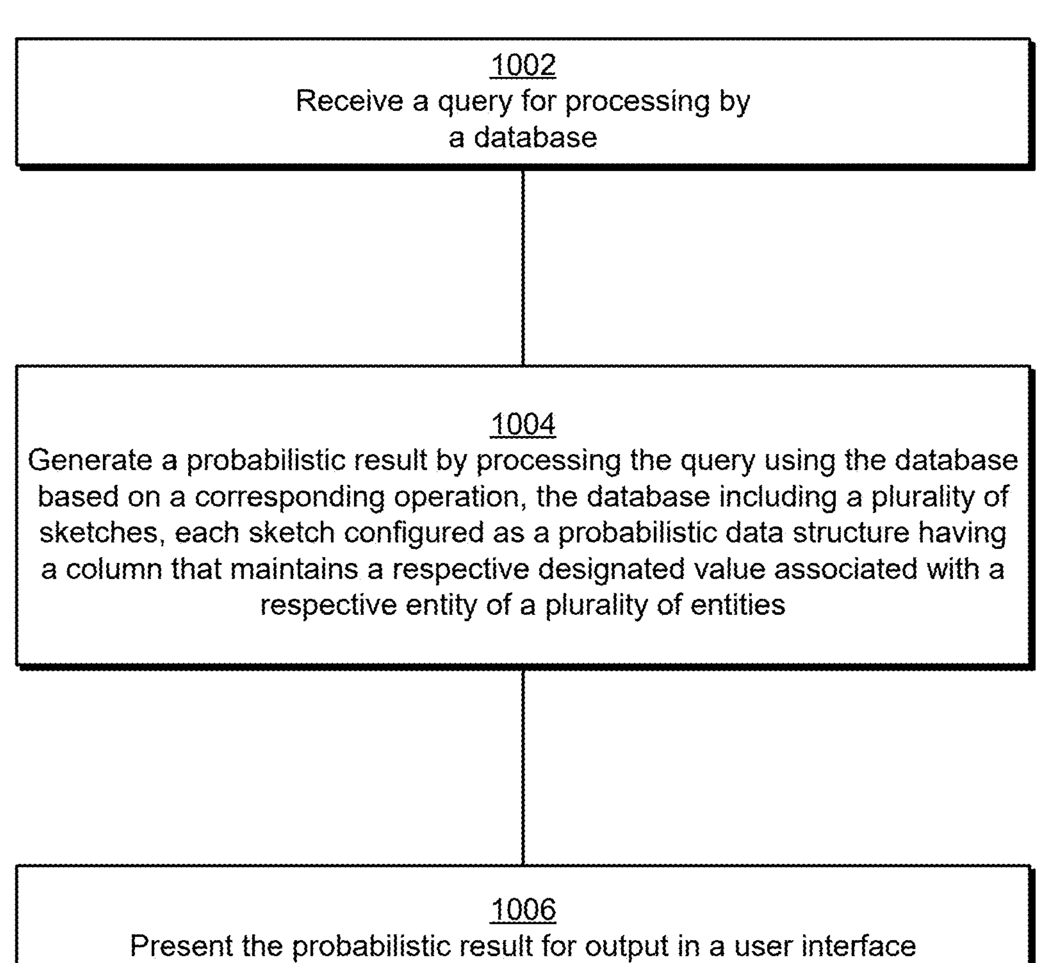
Fig. 10

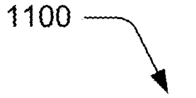
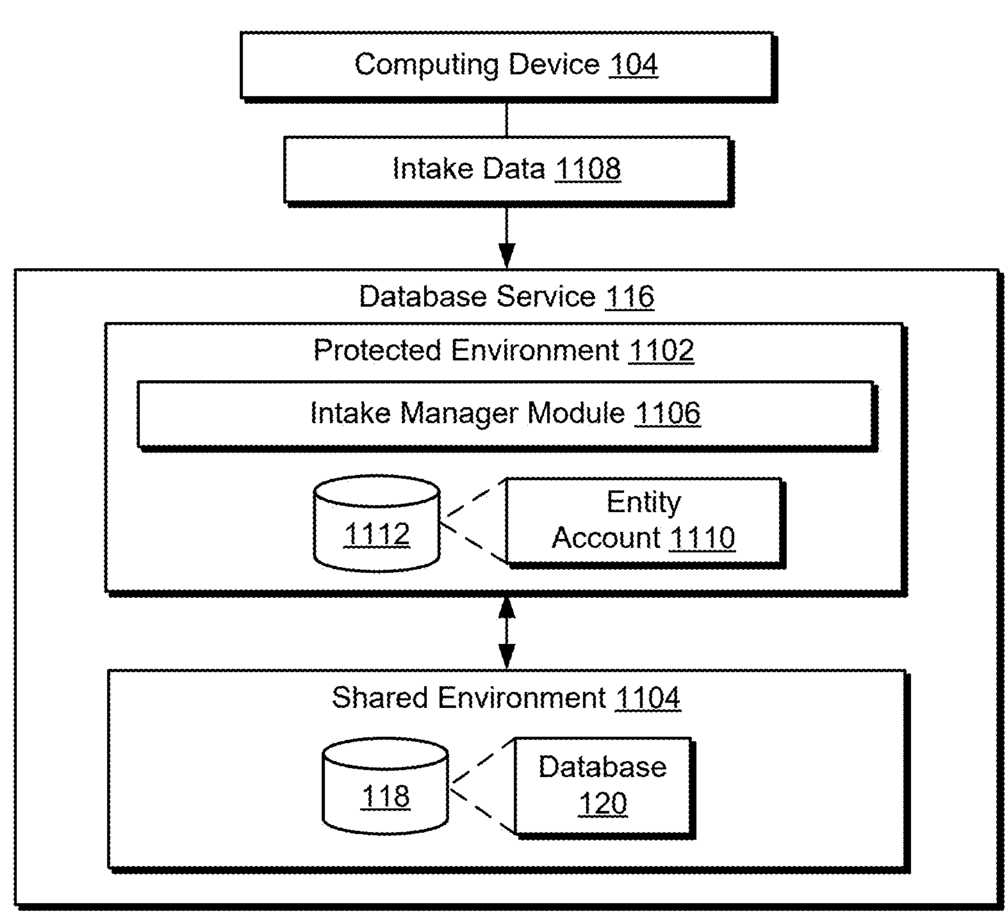
Fig. 11

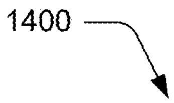

1402
Receive intake data from an entity, the intake data referencing a network source via which a dataset is accessible and how the dataset is to be accessed 1404
Collect the dataset within a protected environment, the dataset including a dataset record including an identity key, a respective attribute, and confidential information 1406
Generate a sketch as a probabilistic data structure based on the identity key and the attribute and independent of the confidential information 1408
Form a mapping of the confidential information to the sketch, the mapping and the confidential information maintained within the protected environment 1410
Communicate the sketch to be stored in a database implemented in a shared environment that is accessible by a plurality of said entities, the database supporting a probabilistic result to a query operation

Fig. 14

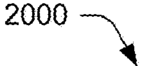

Database Update Module 1704

| | Publisher Audience 1 | Publisher Audience 2 | Publisher Audience 3 | Publisher Audience 4 | Publisher Audience 5 |
|---|---|---|---|---|---|
| Advertiser Audience 1 | | | | | |
| Advertiser Audience 2 | | | | | |
| Advertiser Audience 3 | | | | | |
| Advertiser Audience 4 | | | | | |

Database Update Module 1704

| Advertiser Audience Id | Publisher Audience Id | Overlap Count | Last_ModifiedTs | Result Sketch |
|---|---|---|---|---|
| | | | | |
| | | | | |
| | | | | |

Database Update Module 1704

| | Publisher Audience 1 | Publisher Audience 2 | Publisher Audience 3 | Publisher Audience 4 | Publisher Audience 5 |
|---|---|---|---|---|---|
| Advertiser Audience 1 | | | | | |
| Advertiser Audience 2 | | | | | |
| Advertiser Audience 3 | | | | | |
| Advertiser Audience 4 | **Update** | **Update** | **Update** | **Update** | **Update** |

Fig. 22

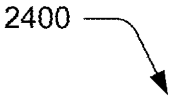

2402
Detect a first sketch of a plurality of sketches is inaccurate due to a change to a dataset record that is used as a basis to generate the first sketch as a probabilistic data structure 2404
Generate second and third sketches as probabilistic data structures based on the change to the dataset record as database replacements in a database 2406
Generate the second sketch directly based on the change to the dataset record 2408
Generate third sketch based on the second sketch

Fig. 24

CHANGE DETECTION AND UPDATES USING PROBABILISTIC DATA STRUCTURES

BACKGROUND

Confidential information of users is under constant attack by malicious parties that attempt to expose and exploit this potentially valuable information. Confidential information, for instance, may include personally identifiable information used to identify a user, itself, involve access to accounts associated with the user, and so forth. Data breaches have become common in which confidential information is exposed of millions and even billions of users due to hacking from these malicious parties. Because of this, users are less willing to share this information and are concerned with how this information is used even by legitimate service provider systems.

Techniques have been developed to address this unwillingness that limit user tracking, reject use of "cookies," and so forth. As a result, computational functionality that relies on this data may fail for its intended purpose. This failure results in inaccuracies caused by incomplete data, causes inefficient use of computational resources that are implemented to overcome these technical challenges, and so forth.

SUMMARY

Change detection and updates using probabilistic data structures are described. In one or more examples, a change is detected to a dataset record that is used as a basis to generate a first sketch as a probabilistic data structure. A second sketch is generated as a probabilistic data structure based on the change to the dataset record. The first sketch is replaced with the second sketch as stored in a database, the database supporting a probabilistic result to a query operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of a digital medium environment in an example implementation that is operable to employ data privacy management techniques described herein as implemented using a probabilistic data structure.

FIG. 3 depicts a system in an example implementation showing operation of a dataset manager module of FIG. 2 in greater detail as forming a sketch and corresponding mappings with respect to confidential information indicating which entities are associated with the sketches.

FIG. 7 depicts a system in an example implementation showing a database structure of a database having probabilistic data structures of FIG. 1 usable to maintain a sketch from a computing device without exposing confidential information.

FIG. 9 depicts an example implementation involving audience exploration to determine audience overlaps between an advertiser and a publisher.

FIG. 10 is a flow diagram depicting an algorithm as a step-by-step procedure in an example implementation of operations performable for accomplishing a result of query processing using a database having probabilistic data structures.

FIG. 11 depicts a system in an example implementation in which a database service implements onboarding and intake as part of a collaboration system.

FIG. 14 is a flow diagram depicting an algorithm as a step-by-step procedure in an example implementation of operations performable for accomplishing a result of entity intake by a collaboration system.

FIGS. 20, 21, and 22 depict examples of operations performed by the database 120 that support real time output in a user interface.

FIG. 24 is a flow diagram depicting an algorithm as a step-by-step procedure in another example implementation of operations performable for accomplishing a result of change detection and updates using probabilistic data structures.

DETAILED DESCRIPTION

Overview

Figure 2:
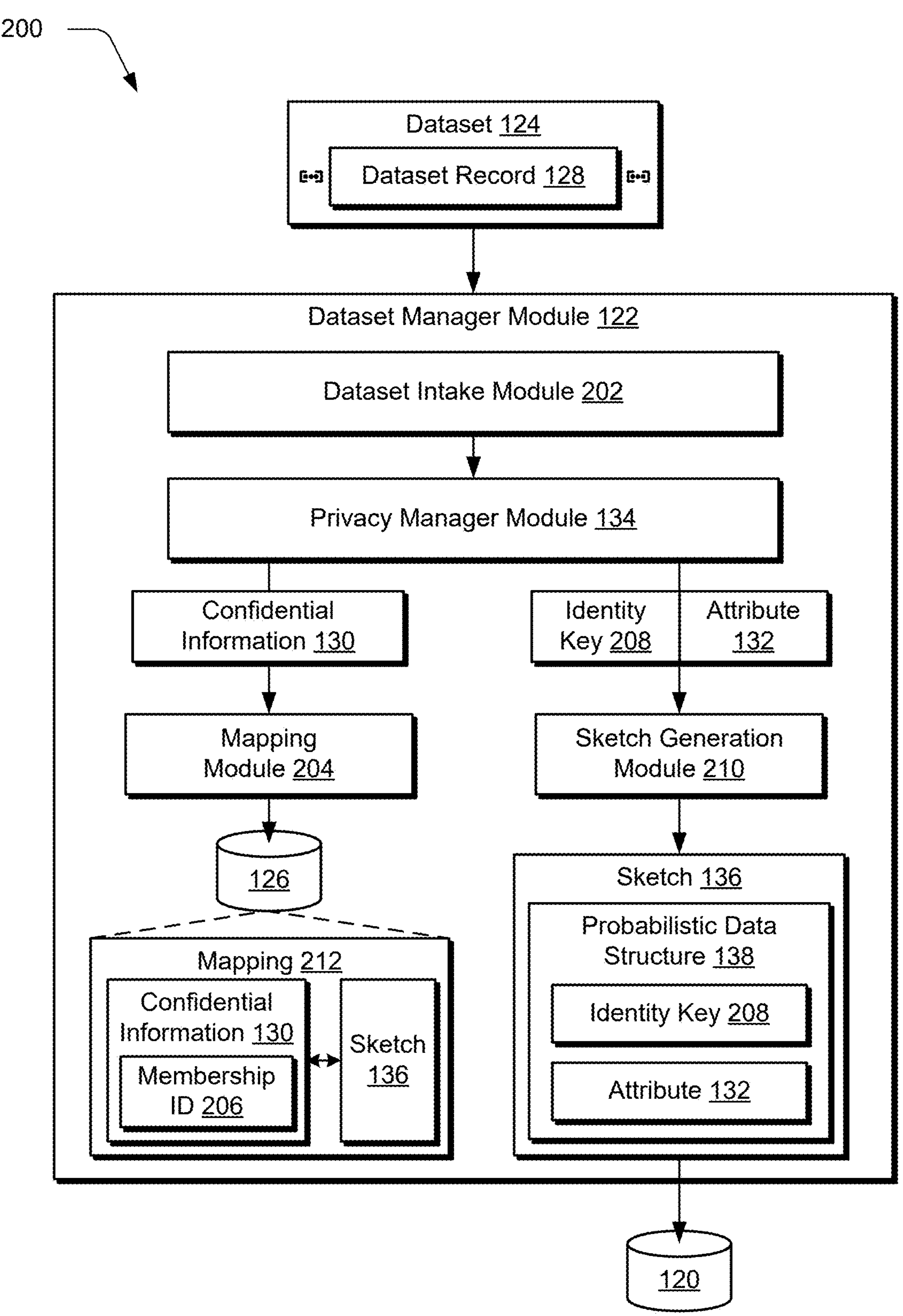
FIG. 2 depicts a system in an example implementation showing operation of a dataset manager module of FIG. 1 in greater detail.

Confidential information refers to a variety of information types, including information usable to identify a user also known as "personally identifiable information," identify membership in particular audiences, potentially sensitive information (e.g., medical information), and so forth. Examples of personally identifiable information, for instance, include a full legal name, nickname, birthday, social security number, passport number, email address, phone number, home address, financial information, and even biometric data such as facial recognition data, retinal scans, fingerprints, and so forth. Additional examples include membership in a particular audience.

As previously described, data breaches caused by malicious parties have resulted in the compromise of millions and even billions of instances of confidential information. In order to protect this information, privacy regulations and other privacy related considerations have been enacted to limit what user data is available for collection. These considerations have been addressed in a variety of ways through local privacy settings of a respective computing device, cookie-related changes in which browsers block cookie storage, and so forth.

Selection of an option "do not track," for instance, restricts collection of navigation data of a user between websites, applications, and so forth. Likewise, removal of support for third-party cookies by browsers also limits an ability of a provider of the cookie to gain valuable user insight usable to track user navigation through pages of a website, navigation between websites, and so forth. Consequently, computational functionality that is configured to leverage this insight often fails and is inaccurate, e.g., recommendation engines, digital content output control functionality, search engines, and so forth.

Accordingly, data privacy management techniques are described herein that address these and other technical challenges in maintaining and sharing data that may contain confidential information. The data privacy management techniques, for instance, are configurable to leverage a probabilistic data structure as a privacy-safe, efficient, and scalable technique in support of data collaboration and query execution. As a result, these privacy-management techniques leverage use of a database having probabilistic data structures and data collaboration systems to ensure privacy regulation compliance as well as adapt to an ever-changing landscape in how user insight is gained.

To do so, probabilistic data structures and a database having probabilistic data structures are employed that do not include confidential information while maintaining data associated with the confidential information through the use of a "sketch." A sketch employs a probabilistic data structure that is used to represent data in a condensed form. Sketches, for instance, employ algorithms (e.g., a Bloom filter, a Theta Sketch, or a MinHash), that support data representation without storing row-level information containing the confidential information, which ensures privacy by eliminating use of user identities, user audiences, or other confidential information. By storing a sketch independent of row-level data, recovery of a corresponding user, entity, or other confidential information associated with the data is not possible. Thus, a database having probabilistic data structures (e.g., the sketch) does not support direct identification of the confidential information. As a result, these techniques support compliance with privacy regulations and eliminate a risk of data leakage.

Sketches are also configurable to represent data in a highly condensed form, thereby reducing an amount of data that is stored and processed. This efficiency supports faster query execution and efficient use of computational resources. Conventional queries that could take days to process by a computing device (e.g., set operations), for instance, are performable in real time using the techniques described herein.

Additionally, the condensed nature of sketches enables efficient multi-cloud, multi-region implementation as well as multiparty collaboration. Therefore, seamless data sharing and query execution is supported across different platforms and regions. In this way, use of sketches as probabilistic data structures as well as databases having probabilistic data structures support a robust and scalable solution to the technical challenges involved with confidential information. Further discussion of these and other examples is included in the following sections and shown in corresponding figures.

Term Examples

A "probabilistic data structure" is a specialized data structure that is configurable to provide probabilistic responses to a query. A probabilistic data structure, for instance, is configurable to define a probability distribution over possible database instances, e.g., possible worlds.

A "Bloom Filter" is an example of a probabilistic data structure that is configurable to test when an element is or is not a member of a set.

A "MinHash" is an example of a probabilistic data structure that is configured to estimate similarity between two or more sets. MinHash works by hashing each element in a set using one or more hash functions. For each hash function, a minimum hash value is selected. Similarity between the set is estimated by comparing the selected minimum hash values.

A "count-min sketch" is an example of a probabilistic data structure that is configurable to estimate a frequency of elements in a dataset.

A "HyperLogLog" is an example of a probabilistic data structure usable to estimate a number of distinct elements in a data set.

A "Theta Sketch" is an example of a probabilistic data structure that is usable for approximate distinct counting and set operation. Theta sketches support set operations such as union, intersection, and set difference.

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Data Privacy Management Environment

FIG. 1 is an illustration of a digital medium environment 100 in an example implementation that is operable to employ data privacy management techniques described herein as implemented using a probabilistic data structure to control confidential information access. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 14.

The service provider system 102 includes a digital service manager module 108 that is implemented using hardware and software resources 110 (e.g., a processing device and computer-readable storage medium) in support of one or more digital services 112. Digital services 112 are made available, remotely, via the network 106 to computing devices, e.g., computing device 104.

Digital services 112 are scalable through implementation by the hardware and software resources 110 and support a variety of functionalities, including accessibility, verification, real-time processing, analytics, load balancing, data storage, and so forth. Examples of digital services include a social media service, streaming service, digital content repository service, database service, content collaboration service, and so on. Accordingly, a communication manager module 114 (e.g., network-enabled application) is utilized by the computing device 104 to access the one or more digital services 112 via the network 106. A result of processing using the digital services 112 is then returned to the computing device 104 via the network 106.

In the illustrated example, the digital services 112 are utilized to implement a database service 116. The database service 116 is illustrated in this example as accessing a storage device 118 that maintains a database 120 having probabilistic data structures 138. The computing device 104 is illustrated as including a dataset manager module 122 that is configured to manage exposure of a dataset 124 (e.g., also illustrated as stored in a storage device 126) to the database service 116.

The dataset 124, for instance, is formed using a plurality of dataset records, an example of which is depicted as dataset record 128. The dataset record 128 in this example includes confidential information 130 and an attribute 132. The dataset record 128, for instance, is associated with an item of digital content (e.g., an email, webpage, etc.) as an identity key (e.g., a column header) and the attribute 132 indicates whether a particular user interacted with the digital content, e.g., as row-level data. The confidential information 130 in this example is a membership identifier (ID) that identifies a particular entity (e.g., user) associated with the attribute 132 as row-level data for the respective identity key.

As previously described, hackers and other malicious parties continually attempt to expose the confidential information 130, e.g., the identification of the membership ID of a particular user in this example. To address these and other technical challenges such as "do not track" functionality and privacy blocking, the dataset manager module 122 employs a privacy manager module 134. The privacy manager module 134 is configured to maintain the confidential information 130 locally by the computing device 104 yet permit sharing of other parts of the dataset record 128 in support of a variety of functionalities, e.g., recommendation engines and so forth.

To do so, the privacy manager module 134 is configurable to form a sketch 136 having a probabilistic data structure 138. The probabilistic data structure 138 is configured to eliminate use of row-level data of the dataset record 128 through use of algorithms such as Bloom filters, MinHash, Theta Sketches, and so forth. This approach eliminates use of row-level information, which is the confidential information 130 in this example.

The probabilistic data structure 138 is configurable to represent the dataset record 128 in a reduced manner by condensing the dataset record 128 into a compact form by elimination of the row-level information. Elimination of row-level information thus significantly reduces an amount of data that is stored and processed, e.g., by the database service 116. For example, one hundred million rows of data on audiences may be condensed into approximately ten kilobytes of data through use of the probabilistic data structure 138 by the sketch 136.

In this way, the compact representation of the probabilistic data structure 138 by the sketch 136 enables efficient multi-cloud, multi-region, and multi-party collaboration, as the smaller data size allows for seamless data sharing and query execution across different platforms and regions. Additionally, the condensed data representation of the probabilistic data structure 138 allows for faster query execution, significantly improving processing speed when compared to conventional database techniques.

In a multi-collaboration scenario, the privacy manager module 134 of the dataset manager module 122 shares a sketch 136 having a probabilistic data structure 138 that is independent of the confidential information 130. An additional computing device 140 may perform similar operations, such that each of the computing devices 104, 140 are able to share data (e.g., attributes and identity keys associated with the confidential information 130) without exposing the confidential information 130. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Data Privacy Management

The following discussion describes data privacy management techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Figure 6:
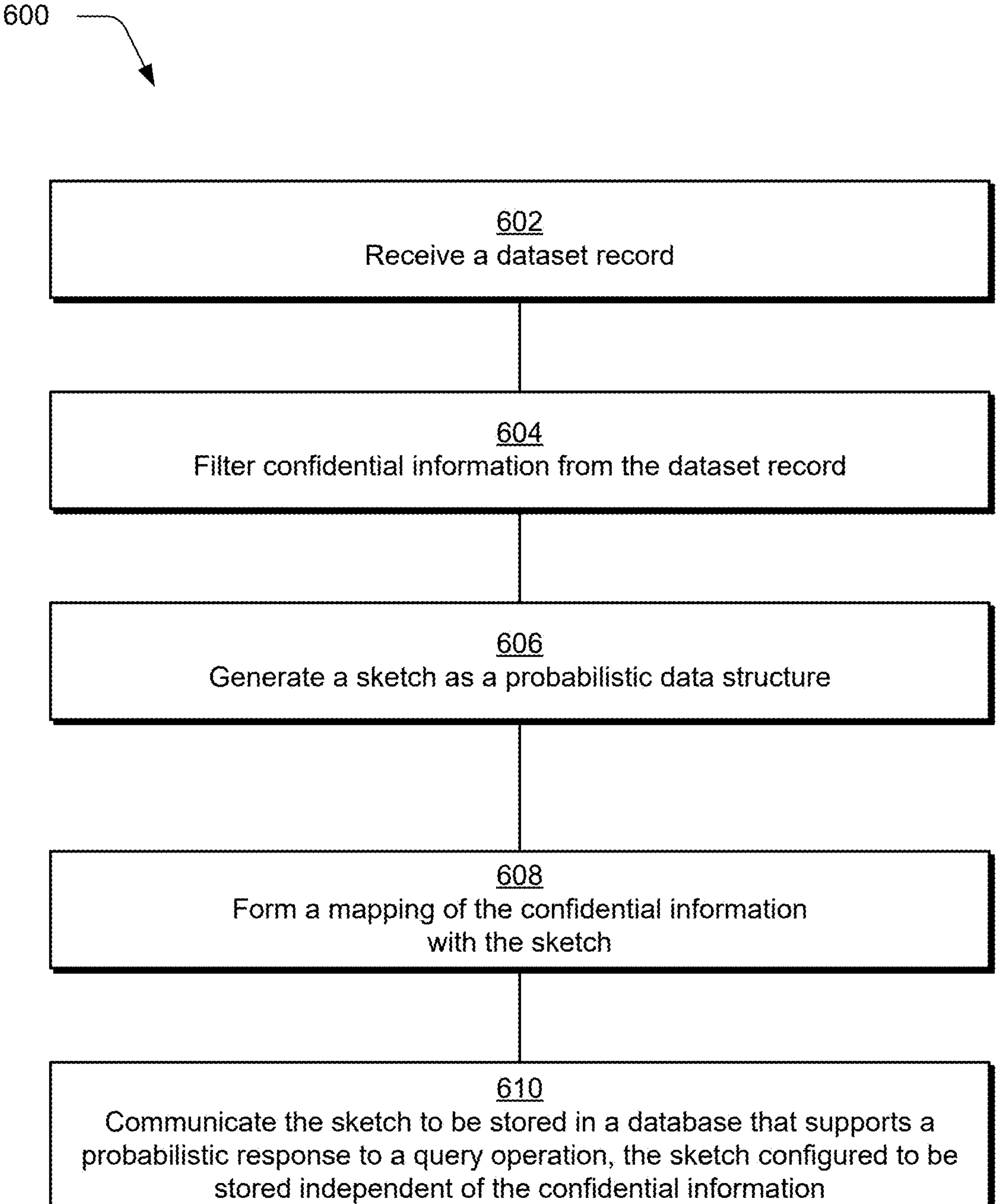
FIG. 6 is a flow diagram depicting an algorithm as a step-by-step procedure in an example implementation of operations performable for accomplishing a result of data privacy management utilizing sketch generation and mapping formation.

FIG. 6 is a flow diagram depicting an algorithm 600 as a step-by-step procedure in an example implementation of operations performable for accomplishing a result of data privacy management utilizing sketch generation and mapping formation. In portions of the following discussion, reference is made in parallel to FIG. 6 along with a discussion of corresponding systems.

FIG. 2 depicts a system 200 in an example implementation showing operation of the dataset manager module 122 of the computing device 104 of FIG. 1 in greater detail. In this example, a data intake module 202 of the dataset manager module 122 receives a dataset record 128 (block 602), e.g., as part of a dataset 124. The dataset 124 may take a variety of forms, such as a comma separated value (CSV) file or other structure including a table. Other unstructured examples are also contemplated, e.g., in which a structure is then derived through additional processing using machine learning upon intake of the structured data. The data intake module 202 may therefore process the dataset 124 into a form that is compatible with the privacy manager module 134.

The privacy manager module 134 is then employed to filter confidential information 130 from the dataset record 128 (block 604). Each dataset record 128, for instance, includes a column having a corresponding identity key and attributes having data values within the column. The dataset record 128 also includes confidential information 130 associated with the attributes (e.g., as row-level data), e.g., identifying entities associated with the attributes as membership IDs. The membership IDs, for instance, are usable to identify respective user populations.

Accordingly, the privacy manager module 134 is configured in this example to filter the confidential information 130 from the dataset record 128 to form a redacted dataset that does not include the confidential information 130. The confidential information 130 is illustrated as being passed to a mapping module 204. As previously described, the confidential information 130 may take a variety of forms, such as a membership ID 206 as depicted in FIG. 2. An identity key 208 identifying a respective column of the dataset record 128 and associated attribute 132 taken from the dataset record 128 are passed as the redacted dataset by the privacy manager module 134 to a sketch generation module 210. Thus, the sketch generation module 210 in this example does not have access to the confidential information 130 when creating a sketch 136.

The sketch generation module 210 is configured to generate a sketch 136 as a probabilistic data structure 138 (block 606) independent of the confidential information 130. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques. Further discussion of sketch 136 generation by the sketch generation module 210 is described in relation to FIGS. 3-5 in the following discussion.

The mapping module 204 is configured to form a mapping 212 between the confidential information 130 and the sketch 136 (block 608). The mapping 212 is usable to resolve what confidential information 130 (e.g., the membership ID 206) corresponds with the sketch 136. The mapping 212 is maintained in storage device 126 locally at the computing device 104 and is not exposed outside of the computing device 104 in this example, thereby protecting the confidential information 130 from compromise by malicious parties.

The mapping 212 is therefore usable to resolve identification of a particular sketch 136 in a probabilistic result to a query processed by the database service 116 when received at the computing device 104. In this way, the database service 116 does not receive the confidential information 130 and thus is unable to determine an identity of the membership ID 206, thereby preserving privacy of a corresponding entity.

The sketch generation module 210 is configurable to leverage internal data structures for different types of data as part of generating the sketch 136. The sketch generation module 210, for instance, is configurable to detect a type of data included in the dataset record 128 to leverage an internal data structure that is selected based on that data type to form one or more sketches 136.

The sketch generation module 210, for example, is configured to identify each column in the dataset 124 (e.g., "i0," "i1," "i2") having an associated identity key 208 (e.g., column header) of the dataset record 128 and associated attribute 132 with a membership ID 206 supplying row-level information. The sketch generation module 210 is configurable to identity a threshold number (e.g., "k") of distinct values based on saliency, i.e., the "most salient" values. The value of the threshold number may be based on a variety of considerations, examples of which include storage and query considerations.

Different data types in this example involve different techniques used by the sketch generation module 210 to form the sketch 136 and thus different internal data structures. For categorical string values, for instance, the sketch generation module 210 identifies the "top k" strings that have a highest amount of cardinality in a subject column, with other string values being grouped together, e.g., as "other." Thus, the sketch generation module 210 detects that the database record 128 involves categorical strings and, responsive to the detecting, identifies a threshold number of the categorical strings based on cardinality. The sketch generation module 210 then forms a number of sketches 136 based on the threshold number of categorical strings. One or more of the categorical strings that are not included in the threshold number are grouped together.

In another example, the sketch generation module 210 detects that the dataset record 128 involves numerical values. In response, the sketch generation module 210 identifies a threshold number of the numerical values that are used to form the sketch 136 or "bucketizes" the numerical values into a "k" number of buckets for inclusion in the sketch 136.

FIG. 3 depicts a system 300 in an example implementation showing operation of the dataset manager module 122 of FIG. 2 in greater detail as forming a sketch and corresponding mappings to confidential information indicating which entities are associated with the sketches. The dataset 124 includes three columns in this example, the "hashEmail[ ]" and "ipAddress[ ]" as examples of identity keys, while the "audienceid[ ]" column includes membership IDs, and values of respective attributes 132 included in respective columns. Therefore, audienceID[ ] "a1" is associated with hashedemails[ ] "E1, E2, E3." Likewise, a hashed email "E3" and a corresponding IP address "ip3" is associated with audience "a1."

In this example, the membership ID 206 is a simple string having a categorical value indicating membership of an audience with respective attributes in columns associated with respective identity keys. Therefore, the sketch and members illustrated in the mapping 212 enumerate different combinations of hashed emails and IP addresses associated with respective audiences.

Representation of various probabilistic data structures are denotable using a hash, for example, in which the hashed email is used as an identity key for an audience to be indicated by the sketch. Therefore, each hashed email associated with audience "a1" is grouped and used to create a "clean" sketch representation for "a1." Membership IDs indicate "E1," "E2," and "E3" are members of the corresponding sketch, e.g., "hashEmail-a1" as illustrated. This process is also repeated for the IP addresses in the illustrated example.

In this way, the rows and columns are effectively pivoted into a sketch-based inverted index. The mapping 212 therefore provides a cross reference between the sketch and corresponding membership IDs that is usable to resolve which entities associated with respective membership IDs are associated with respective sketches 136 without exposing this relationship outside of the computing device 104.

Figure 4:
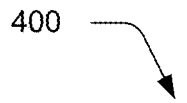
FIG. 4 depicts a table in an example implementation showing types of sketches generated for respective data types by a dataset manager module.

FIG. 4 depicts a table 400 in an example implementation showing types of sketches generated for respective data types by a dataset manager module 122. As previously described, the dataset manager module 122 is configured to employ internal data structures as a guide to sketch generation. Therefore, the dataset manager module 122 is configurable to select from a plurality of internal data structures based a data type to be processed to form a respective sketch 136. In this way, the dataset manager module 122 is configurable to generate sketches 136 having a variety of configurations.

In a first example of a "categorical" data type, sketches are generated that support "membership querying," "cardinality estimators," and "similarity checks." For a second example of a "categorical number" data type, sketches are also generated that support "membership querying," "cardinality estimators," and "similarity checks." In a third example of "continuous valued" data type, sketches are generated that support "membership querying," "cardinality estimators," "similarity checks," "frequency estimators," and "rank estimators." In this way, the internal data structures act as a guide in sketch generation by the dataset manager module 122. A variety of other examples are also contemplated.

For a simple scenario that does not involve dimensionality of the designated values, the following operations are performed by the dataset manager module 122, and more particularly the sketch generation module 210:

For each row in the dataset 124:
- For each audience "Ai" in audience list (A1, A2, . . . , An);
  - For Identity Type in [HashedEmail, ipAddress];
    - Add each of the IDs of "IdentityType" in row to "Ai-identity type" sketch.

This results in the creation of sketches as variations of cardinality estimators, e.g., Theta Sketches, HyperLogLog, and Membership based sketches such as Bloom filters on an audience ID/identity type granularity. In this example, the audience ID maps to a categorical type.

Figure 5:
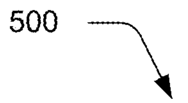
FIG. 5 depicts an example implementation of sketch generation methodology employed by a dataset manager module.

FIG. 5 depicts an example implementation 500 of sketch generation by a dataset manager module 122 that addresses dimensional values in a dataset 124. In a scenario involving dimensional values, in addition to the audience data, extra dimensional information is added to provide additional information. In the illustrated example, "Hashed Email" is associated with additional information including "age," "gender," and "preferences[ ]." Therefore, data types for "age" include "categorical number," for "gender" include "categorical," and for "preferences" include "categorical."

The granularity of sketches generated by the dataset manager module 122 is configurable as a combination of audience ID, identity type, dimension name, and dimension discretized value. The following operations are performed by the dataset manager module 122, and more particularly the sketch generation module 210:

For each row in the dataset 124:
- For each audience "Ai" in audience list (A1, A2, . . . , An);
  - For Identity Type in [HashedEmail, ipAddress];
    - Add each of the IDs of "IdentityType" in row to "Ai-identity type dimension value" sketch.

In a scenario involving continuously valued data, the sketch generation module 210 preprocesses and discretizes the data in terms of percentiles "p0," "p10,", "p20," . . . , "p90," "p100" where "p100" is a maximum value and "p0" is a minimum value. This permits the sketch generation module 210 to discretize the continuously valued attributes into buckets, i.e., "bucketize" the values of the attributes.

For a timeseries data type, the dataset 124 includes a timestamp column and corresponding data that is a subject of the timestamp. Therefore, each row of the dataset 124 may include the following:

Identity type, e.g., hashed email, IP address that generated the data;

Timestamp of the event;

Metric, e.g., sum of impressions;

Metric value; and

Optional dimensional fields such as "adset," "adgroup," and so on.

The following operations are performed by the dataset manager module 122, and more particularly the sketch generation module 210 in a timeseries scenario:

For each row in the dataset 124:
- For each metric "Mi" in a metric list (M1, M2, . . . , Mn);

For Identity Type in [HashedEmail, ipAddress];
For each dimension field:
For distinct metric aggregation value:
Add each of the IDs of Identity Type in row to date-hour-identitytype-metric-metric-value-dimension-value sketch.

The granularity of the sketches in this scenario supports queries such as "find a sum of each of the impression that occurred on 26 August Hour 2 for hashed emails" which would cause the database service 116 to return a corresponding sketch as a probabilistic result. Of note, the distinct value of the metric value is also encoded in the sketch in this example without sampling, which increases accuracy over conventional sampling based techniques.

Returning again to FIG. 2, the sketch 136 is then communicated for storage in a database 120 having probabilistic data structures 138 that supports a probabilistic result to a query operation. The sketch 136 is configured to be stored independent of identification of the entity (block 610) within a database having probabilistic data structures 138. In this way, the confidential information 130 is not exposed outside of the dataset manager module 122 and the service provider system 102.

FIG. 7 depicts a system 700 in an example implementation showing a database structure of the database having probabilistic data structures 138 usable to maintain a sketch 136 from a computing device 104 without exposing confidential information. The database service 116 includes a database manager module 702 configured to process queries using the database 120 and return probabilistic results to the queries using the sketches 136.

Each database service 116 includes one or more databases 120 having probabilistic data structures 138, in which each database 120 has probabilistic data structures 138 including one or more tables 704 having one or more columns 706 that are represented, respectively, using one or more sketches 136. This structure supports flexible creation of spaces for storing logically separated datasets and also supports schema definitions at a table/dataset level. The structures also support access controls. A schema of the tables 704 may be defined during design phase of the database 120 having probabilistic data structures 138 or auto inferred during loading of a dataset 124 to the table 704 by the database manager module 702.

Conventionally, a relational database is based on a mathematic notion of a set and corresponding set operations. The database 120 having probabilistic data structures 138 as described herein relies on a construction of a set using a sketch 136. A sketch 136, as previously described, is a probabilistic data structure that does not store individual dataset records 128 and thus does not record record-level identity, i.e., the membership ID or other confidential information. Although use of the sketch 136 and database 120 having probabilistic data structures 138 has been described for use in data privacy management, these techniques are also applicable to generic datasets 124 as well.

Figure 8:
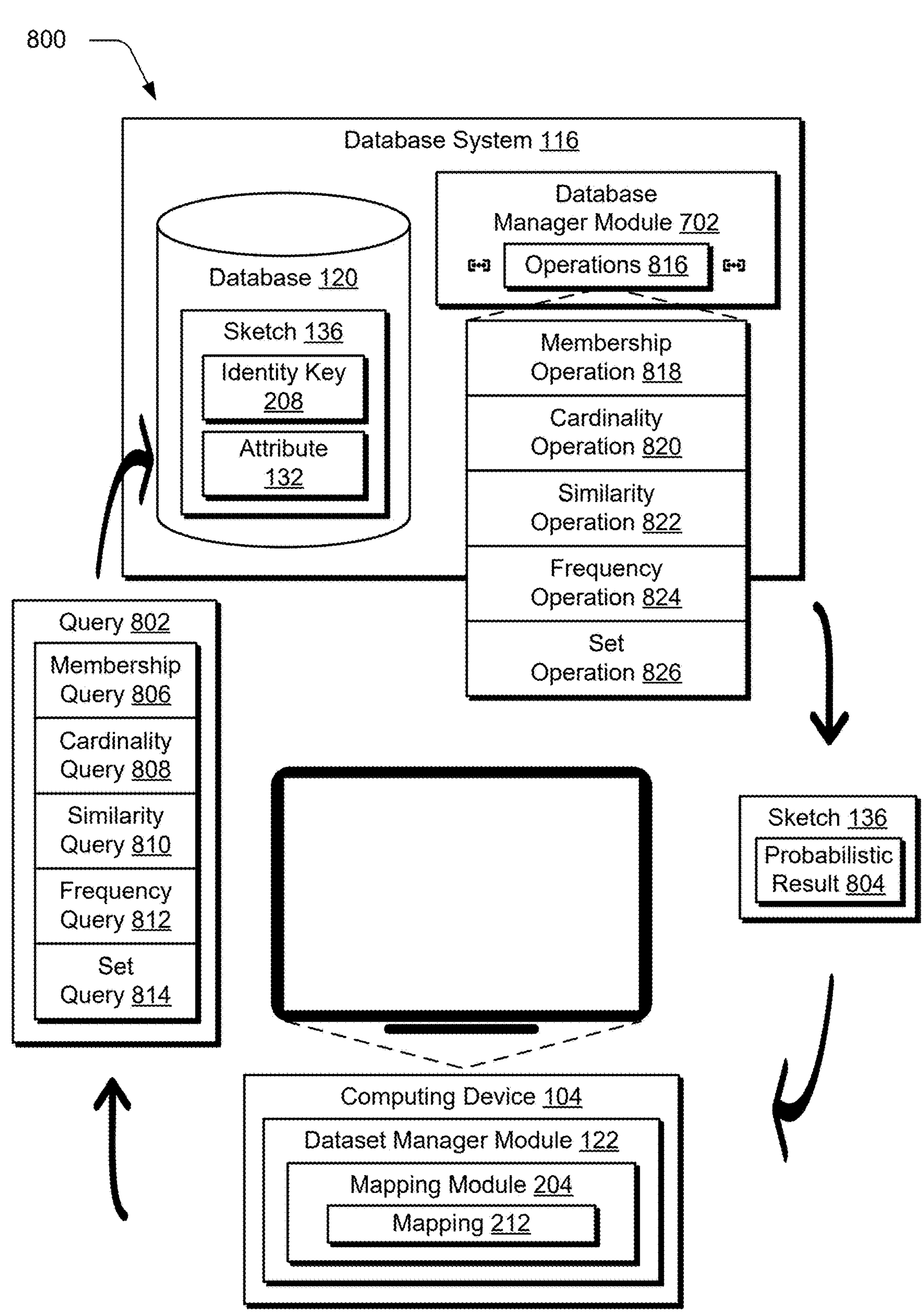
FIG. 8 depicts a system in an example implementation showing generation of a query by a computing device and generation of a probabilistic result as a response to the query by the database system.

FIG. 8 depicts a system 800 in an example implementation showing generation of a query by a computing device and generation of a probabilistic result as a response to the query by the database service 116. In this example, the dataset manager module 122 is employed by the computing device 104 to generate a query 802. The database manager module 702 of the database service 116 then processes the query 802 using the database 120 having probabilistic data structures 138 to generate a probabilistic result 804. The response in the illustrated example includes a sketch 136 having the probabilistic result 804 that is selected and/or generated based on the query 802.

The query 802 is configurable in a variety of ways. In a first example, the query 802 is a membership query 806. The membership query 806 is usable to pose a question such as "is a particular ID present in a set?" e.g., using a Bloom filter as the probabilistic result 804. In a second example, the query 802 is configured as a cardinality query 808. A cardinality query 808 is usable to pose a question such as "How many IDs are present in a set?" with a probabilistic result 804 as a Theta Sketch, HyperLogLog, HyperLogLog++, and so on.

In a third example, the query 802 is configurable as a similarity query 810 structured to pose a question of "how similar are two sets?" A response to the query is formable using a MinHash as the probabilistic result 804. In a fourth example, the query 802 is configured as a frequency query 812 that is configured to pose a question such as "What is the frequency of occurrent of a particular event?" A response to the query is formable using a Count-Min sketch.

These queries support a variety of use cases. In a customer dataset example, the queries support materialization. For example, given a sketch and a list of identities, materialize a sketch as a set of identities that represent an audience corresponding to the sketch. To do so, the database manager module 702 performs repeated membership lookups and queries against the sketch.

In another example, an estimate of the cardinality of an audience set size is queried, in which the audience is represented using a corresponding sketch 136. In a further example, given two audiences (e.g., audience "A" and audience "B"), each as a respective sketch 136, build a new audience as a union of these two audiences, represented as a respective sketch 136. In yet another example, a look-a-like model is built of a seed audience based on a sketch 136. For frequency and reach, reach and frequency to a desired audience are estimated from advertising logs. A variety of other examples are also contemplated, such as a set query 814 usable to specify a respective set operation such as "union," "intersect," and so forth.

The database manager module 702, therefore, is configurable to perform a variety of operations 816 based on the types of queries received. Illustrated examples of which include a membership operation 818, cardinality operation 820, similarity operation 822, frequency operation 824, set operation 826, and so on. Examples of operations and corresponding outputs include:

isPresent(string element)→Boolean;
union(sketch)→sketch;
intersect(sketch)→sketch;
getEstimatedCardinality→long;
similarityScore(sketch)→double; and
aNotb(sketch)→sketch.

The above examples include instances in which operations involve two or more sketches to generate a new sketch, e.g., union and intersect, a-not-b, and so forth.

A union operation, as an example of a set operation 826, may be performed by the database manager module 702 as a lossless operation through use of a sketch 136. Each of the components represented by the sketches 136, for instance, are added together to produce a lossless version of a net sketch, e.g., through use of Bloom filters, Theta sketches, and so forth.

An intersect operation, on the other hand, may be "lossy." Theta sketches support a native intersect operation, for instance, which is usable to produce a new effective Theta sketch but may include additional error over any predecessors. A native intersect operation does not exist for a Bloom filter. Therefore, a deferred evaluation is performed through use of deferred execution to create a reference to an intersect operation and which Bloom filters are involved in that operation. When such a reference exists, deferred execution is performed by the database manager module 702, e.g., during a "isPresent" check on a sketch 136.

When an actual computation is performed as part of deferred execution, a truth table may be created with execution results, e.g., "isPresent" checks for each entry. In this way, deferred execution is usable to support operations not natively supported by particular types of probabilistic data structures through reference to respective sketches which are then performed at a later point in time, which is not possible in conventional techniques.

FIG. 9 depicts an example implementation 900 involving audience exploration to determine audience overlaps between an advertiser and a publisher. The identity key in this example is "hashed_email" and is based on a comparison of sketches generated, respectively, from datasets of an advertiser 902 and a publisher 904. The advertiser 902 audience (e.g., "a1," "a2," "a3," "a4") is indexed as a sketch 136 "sketch(a(i))" into a database having probabilistic data structures 138. A publisher 904 audience (e.g., "p1," "p2," "p3," "p4"), likewise, is indexed into a sketch and stored in the database having probabilistic data structures 138 as "sketch(p(j))."

In order to compute an overlap of these audiences, a cross product of two arrays of sketches is computed as follows:

```
Let Identity Key=Email;
for audience-sketch in [audience1-email-cleanSketch,
    audience2-email-Sketch, . . . ]:
  for publisher-sketch in [publisher-email-fullPopulationSketch, pub-aud1-email-Sketch . . . ]
    audience-sketch.getThetaSketch.intersect(publisher-
      sketch.getThetaSketch)
```

Thus, in this example, a Theta sketch is retrieved from an audience sketch and a publisher sketch to perform the intersection.

In another example involving materialization, the following timeline of events has occurred:

- t1—advertiser uploaded audience-a4 with hashed emails as a match key;
- t2—advertiser compared a4 with other publisher audiences and chose a4 for activation using the same hashed email identity key; and
- t3—advertiser materialized a temporary audience temp-audience based off audience-a4.

Audience "a4" is then chosen for materialization by the publisher 904. To do so, the dataset manager module 122 retrieves a sketch 136 associated with the audience for identity key "hashed-email" from the database having probabilistic data structures 138. The dataset manager module 122 then accesses a corresponding probabilistic data structure 138 (e.g., Bloom filter) to generate and iterate through a list of each of the identifiers associated with the publisher 904. If "isPresent" is "yes" then it is added to a temporary activation list that contains the IDs and is sent to the publisher 904. A variety of other examples are also contemplated.

FIG. 10 is a flow diagram depicting an algorithm 1000 as a step-by-step procedure in an example implementation of operations performable for accomplishing a result of query processing using a probabilistic database. A query is received for processing by a database 120 (block 1002). A probabilistic result is then generated by processing the query using the database 120 based on a corresponding operation. The database 120 includes a plurality of sketches, each sketch configured as a probabilistic data structure having a column that maintains a respective attribute associated with a respective entity of a plurality of entities (block 1004). The probabilistic result is then presented for output in a user interface (block 1006).

In the following discussion, onboarding techniques are first described that involve obtaining intake data to setup a particular entity with access to a database service 116. Compute operations are also described within a shared environment (e.g., using operations 816 by a database manager module 702), which may then employ resolution of confidential information (e.g., membership IDs) within respective protected environments. Additional operation techniques include use of a probabilistic response to a query for audience materialization and activation without exposure of confidential information 130 outside of respective protected environments.

FIG. 14 is a flow diagram depicting an algorithm 1400 as a step-by-step procedure in an example implementation of operations performable for accomplishing a result of entity intake by a collaboration system. In portions of the following discussion, reference is made in parallel to FIG. 14 along with a discussion of corresponding systems.

FIG. 11 depicts a system 1100 in an example implementation in which a database service 116 implements onboarding and intake as part of a collaboration system. The database service 116 in this example includes a protected environment 1102 and a shared environment 1104. The protected environment 1102 is configured to restrict outside access by third parties to data and executable code contained within the protected environment 1102. In contrast, the shared environment 1104 is configured to permit outside access for data collaboration. Examples of a protected environment 1102 include a sandbox, a container, an isolated execution environment, an emulator, and so forth that are executable by a computing device using a processing device and storable using a computer-readable storage medium, e.g., that is non-transitory.

In the illustrated example, an intake manager module 1106 is executed within the protected environment 1102 to receive intake data 1108 from an entity, e.g., a computing device 104. The intake data 1108 references a network source via which a dataset is accessible and how the dataset is to be accessed (block 1402), e.g., a network address, IP address, application programming interface, and so forth. The intake data 1108 is also configurable to specify login credentials that are verifiable to gain this access, referencing data formats supported by the dataset 124 obtained from the network source, and so forth.

In response, the intake manager module 1106 then configures an entity account 1110 (stored in a storage device 1112) which includes forming a protected environment 1102 as associated with the respective entity, e.g., solely, such that outside access is permitted for that entity and other entities that have received permission from the entity. Once the entity account 1110 is formed, the database service 116 is configured to generate a sketch 136 to be maintained within the database 120 of the database service 116.

Figure 12:
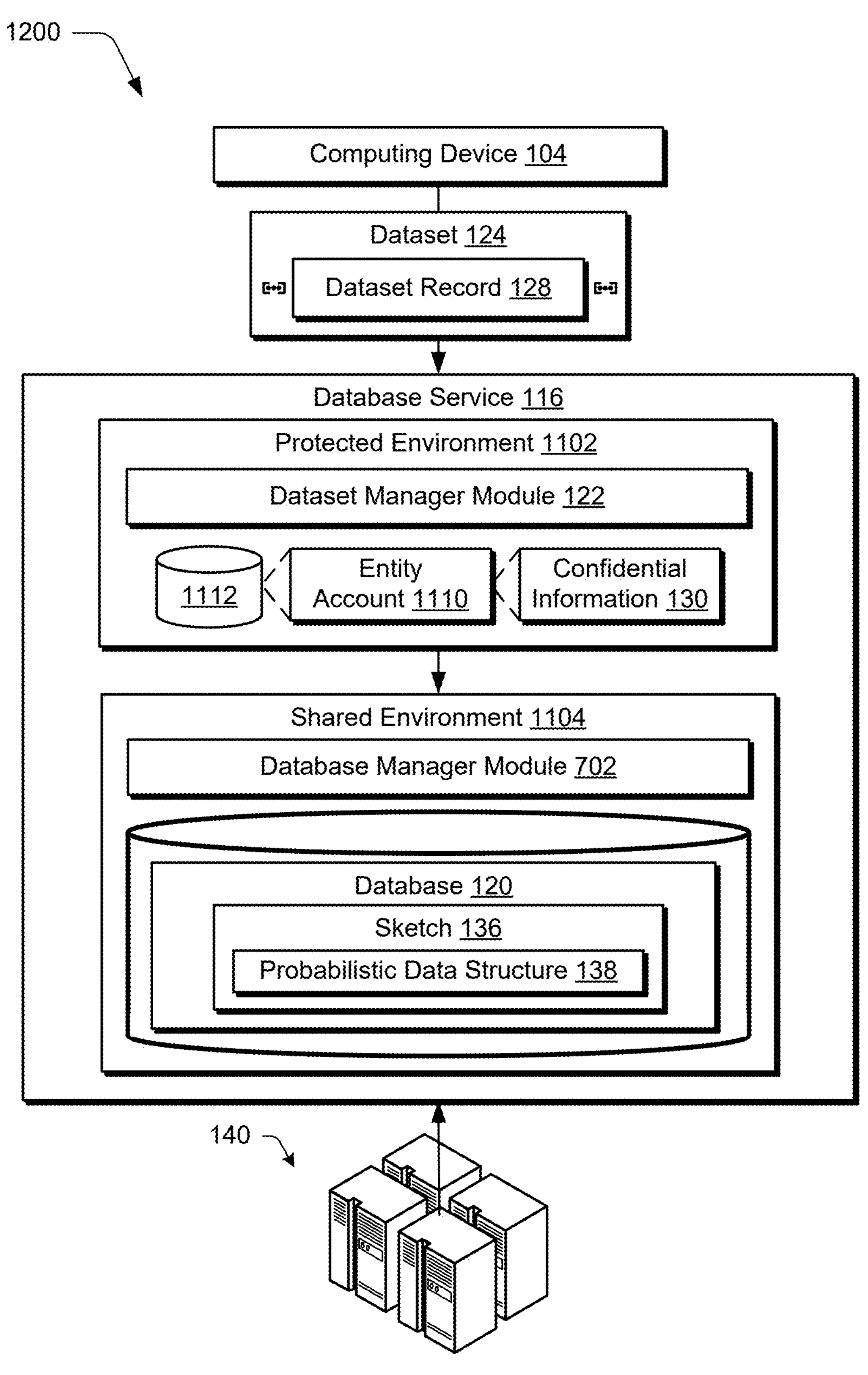
FIG. 12 depicts a system in an example implementation in which a database service implements sketch generation within a protected environment and sketch sharing within a shared environment as part of a collaboration system.

FIG. 12 depicts a system 1200 in an example implementation in which a database service 116 implements sketch generation within a protected environment and sketch sharing within a shared environment as part of a collaboration system. In this example, in contrast to FIG. 2, the dataset manager module 122 is implemented as part of the database service 116 within the protected environment 1102.

The dataset manager module 122 is configured to maintain the confidential information 130 within the protected environment 1102, e.g., within an entity account 1110. The database manager module 702, on the other hand, is executed within a shared environment 1104 to permit sharing of the sketch 136 without exposing the confidential information 130.

Figure 13:
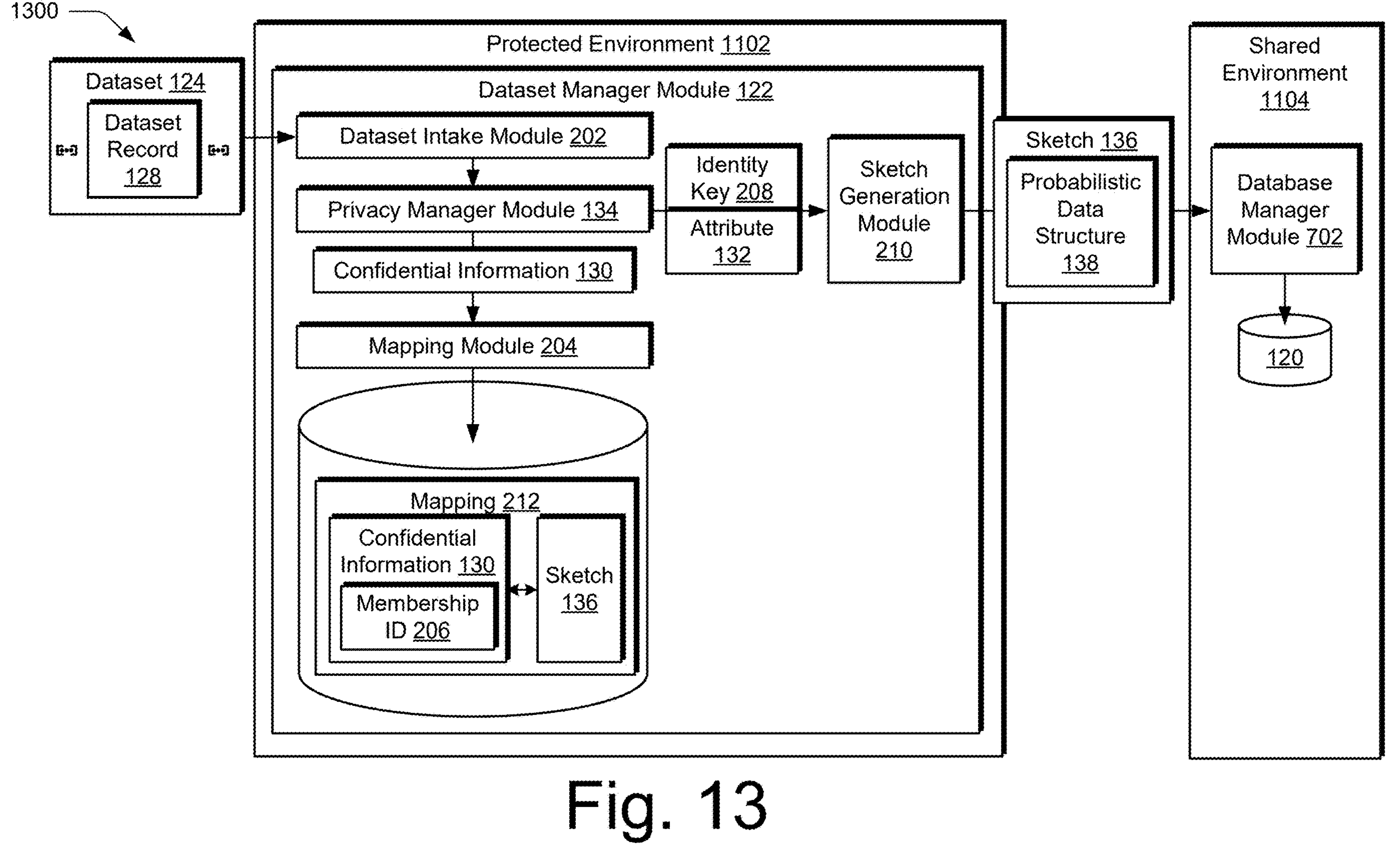
FIG. 13 depicts a system in an example implementation in which a dataset manager module of the database service implements sketch generation within a protected environment.

FIG. 13 depicts a system 1300 in an example implementation in which a dataset manager module 122 of the database service 116 implements sketch generation within a protected environment 1102. In this example, a data intake module 202 of the dataset manager module 122 collects the dataset 124 within a protected environment 1102. The dataset includes 128 a dataset record including an identity key, a respective attribute, and confidential information as previously described (block 1404). The dataset 124 may take a variety of forms, such as a comma separated value (CSV) file or other structure including a table. Other unstructured examples are also contemplated, e.g., in which a structure is then derived through additional processing using machine learning upon intake of the structured data. The data intake module 202 may therefore process the dataset 124 into a form that is compatible with the privacy manager module 134.

The privacy manager module 134 is then employed to filter confidential information 130 from the dataset record 128. Each dataset record 128, for instance, includes a column having a corresponding identity key and attributes having data values within the column. The dataset record 128 also includes confidential information 130 associated with the attributes (e.g., as row-level data), e.g., identifying entities associated with the attributes as membership IDs. The membership IDs, for instance, are usable to identify respective user populations.

Accordingly, the privacy manager module 134 is configured in this example to filter the confidential information 130 from the dataset record 128 within the protected environment 1102 to form a redacted dataset that does not include the confidential information 130. The confidential information 130 is illustrated as being passed to a mapping module 204 within the protected environment 1102. As previously described, the confidential information 130 may take a variety of forms, such as a membership ID 206 as depicted in FIG. 2. An identity key 208 identifying a respective column of the dataset record 128 and associated attribute 132 taken from the dataset record 128 are passed as the redacted dataset by the privacy manager module 134 to a sketch generation module 210. Thus, the sketch generation module 210 in this example does not have access to the confidential information 130 when creating a sketch 136.

The sketch generation module 210 is configured to generate a sketch 136 based on the identity key and the attribute and independent of the confidential information (block 1406). The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques.

The mapping module 204 is configured to form a mapping 212 between the confidential information 130 and the sketch 136 (block 1408). The mapping 212 is usable to resolve what confidential information 130 (e.g., the membership ID 206) corresponds with the sketch 136. The mapping 212 is maintained in a storage device 126 within the protected environment 1102 and is not exposed outside of the protected environment 1102, thereby protecting the confidential information 130 from compromise by malicious parties.

The mapping 212 is therefore usable to resolve identification of a particular sketch 136 in a probabilistic result to a query processed by the database service 116 when received at the computing device 104. In this way, the database service 116 does not receive the confidential information 130 and thus is unable to determine an identity of the membership ID 206, thereby preserving privacy of a corresponding entity.

The sketch 136, as independent of the confidential information 130, is then communicated by the dataset manager module 122 to be stored in a database 120 within the shared environment 1104 (block 1410). Sharing of the sketches supports a variety of operations without exposing the confidential information 130, which is not possible in conventional techniques.

Figure 16:
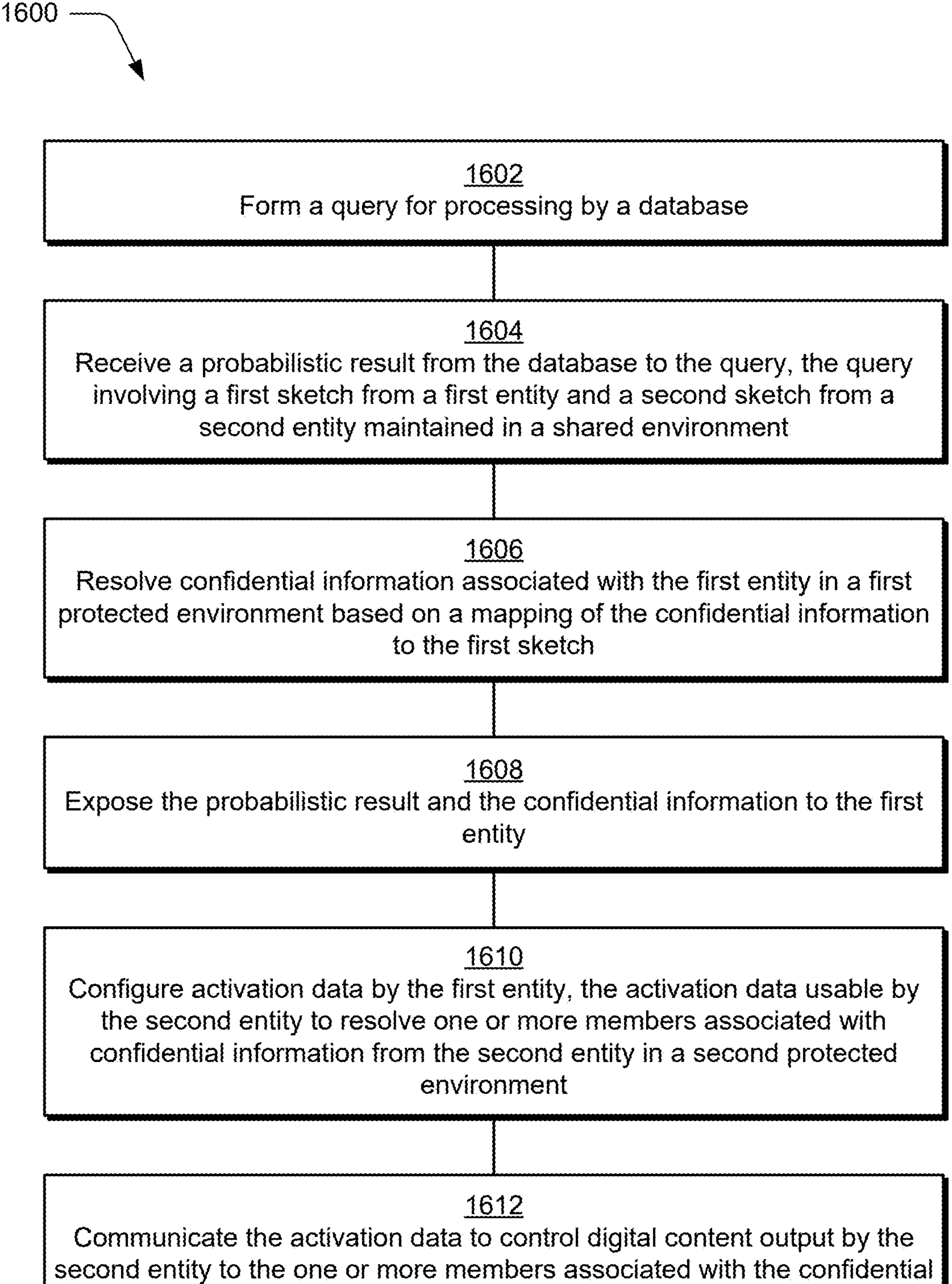
FIG. 16 is a flow diagram depicting an algorithm as a step-by-step procedure in an example implementation of operations performable for accomplishing a result of collaboration between entities using protected and shared environments that leverage probabilistic data structures.

FIG. 16 is a flow diagram depicting an algorithm 1600 as a step-by-step procedure in an example implementation of operations performable for accomplishing a result of collaboration between entities using protected and shared environments that leverage probabilistic data structures. In portions of the following discussion, reference is made in parallel to FIG. 16 along with a discussion of corresponding systems.

Figure 15:
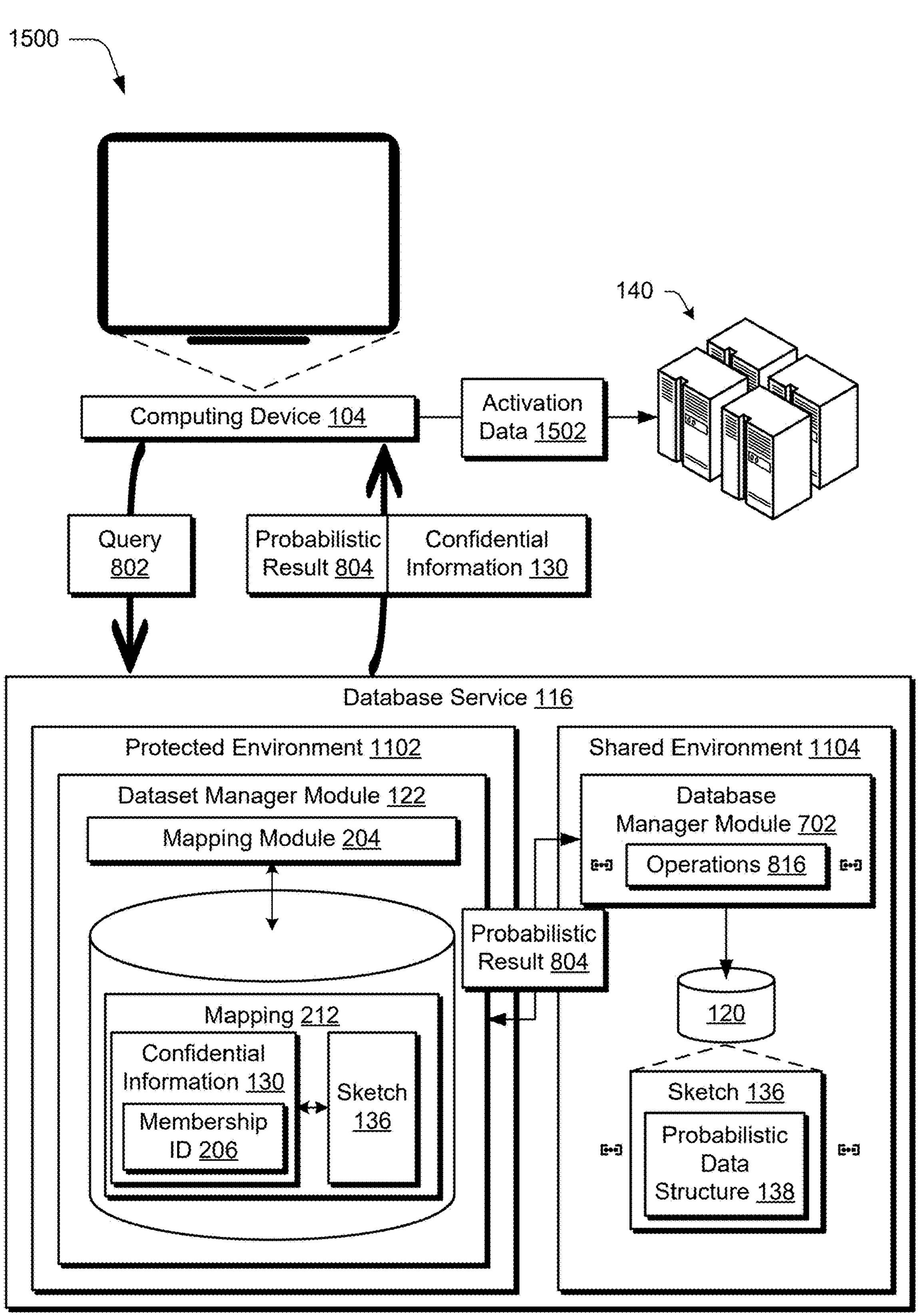
FIG. 15 depicts a system in an example implementation of a collaboration system that supports queries and probabilistic results to the queries without exposing confidential information.

FIG. 15 depicts a system 1500 in an example implementation of a collaboration system that supports queries and probabilistic results to the queries without exposing confidential information 130. This example begins by forming a query by a first entity (e.g., the computing device 104) for processing by a database 120 (block 1602). The query 802 in this example may be passed directly to the database manager module 702 within the shared environment 1104 or indirectly via the dataset manager module 122 within the protected environment 1102, e.g., the entity as "logged in" to an entity account 1110 and thus operates within the protected environment 1102.

The database manager module 702 then processes the query 802 using one or more operations 816 with respect to the database 120. A probabilistic result 804 is generated based on the processing as further described below by the database 120 based on the query 802. The query 802, for instance, may involve a first sketch from a first entity and a second sketch from a second entity maintained in the database 120 of the shared environment 1104 (block 1604), e.g., an intersect operation, a union operation, and so forth. The probabilistic result 804 is then received by the dataset manager module 122 within the protected environment 1102 from the database manager module 702 in the shared environment 1104.

The dataset manager module 122, through use of the mapping module 204, is then configured to resolve which of the confidential information 130 associated with the first entity (e.g., the computing device 104) in a first protected environment (e.g., protected environment 1102) based on a mapping of the confidential information 130 to the first sketch 136 (block 1606). The mapping 212, for instance, is configurable by the mapping module 204 to detect which of the confidential information 130 is represented in a respective sketch 136, e.g., membership IDs. In this way, the first entity is configurable to resolve member identity of known members but is not able to resolve identities of unknow members, e.g., from a second entity associated with the additional computing device 140.

The dataset manager module 122 is then configured to expose the probabilistic result 804 and the confidential information 130 to the first entity (block 1608), e.g., for presentation and display in a user interface. As a result, the computing device 104 is given insight into known membership IDs associated with the probabilistic result 804 and based on this may take a variety of actions.

The first entity associated with the computing device 104, for instance, configures activation data 1502. The activation data 1502 is usable by the second entity (e.g., additional computing device 140) to resolve one or more members associated with confidential information from the second entity in a second protected environment (block 1610). The second entity, for instance, also has an associated protected environment that is inaccessible by the computing device 104 via which a mapping is also maintained such that the second entity may resolve membership IDs known to the second entity.

The first entity may then communicate the activation data to control digital content output by the second entity to the one or more members associated with the confidential information by the second entity (block 1612), e.g., to control output of emails, instant messages, webpages, advertisements, and so forth. The activation data may be communicated directed by the computing device 104 to the additional computing device 140, indirectly through the database service 116 in order to resolve the membership IDs and any other confidential information within a respective protected environment, and so forth.

Thus, in these examples the collaboration system generates sketches for each participant that shares access within the shared environment 1104. The sketches for any entity are generated independently from the generation of any other entity's sketches. Advertisers, partners and publishers, for instance, provide intake data 1108 having associated metadata and location for the data access point from where data access is to be obtain. The intake data 1108 includes an advertiser or publisher's identity keys and the cadence (e.g., periodicity "T") at which sketch generation is to occur. An entity's user data is read once at interval "T" and transformed into a collection of sketches 136 for a given entity.

The data access point employed by the advertiser or publisher may be either by reference or uploaded to a blob storage. The data read by the database service 116 is ephemeral so the reference or uploaded data is deleted after generating the sketches 136 for the entity. In a scenario involving advertiser data enrichment, after the onboarding of an audience completes, the audience identity keys are sent by RTCDP Collaboration to specified collaborating partners. The response provided by a partner is read and a sketch 136 is generated for the partner ID (PID).

The collection of sketches 136 generated for an entity are persisted separately for each entity within one or more database 120 associated with the entity. The sketches 136, as previously described, are solely visible to the database service 116 and do not contain confidential information 130 such as member or record level data, e.g., no email IDs, no IP addresses. This partition or area where each of the databases 120 are stored is also referred to as an "ID Free Zone." The ID free zone does not contain membership IDs nor does this area contain any data that would allow membership IDs to be constructed or retrieved.

The database service 116 and database 120 are also operatable independent of awareness of a collaborators technology stack or cloud provider, with which, to collaborate. An advertiser or a publisher, for instance, solely provides a data access point information to the database service 116 and not to their collaborating parties. This agnosticism of other collaborators'technology stack allows the collaboration to exist across many parties at scale. The information and sketches 136 for a given entity are fully independent from any other entity's sketches.

In one or more implementations, DCRs and Publisher CAPIs are usable for providing advertiser campaign performance metrics between a single Advertiser and a single Publisher. Use of the database 120 and sketch 136 having a probabilistic data structure 138 is another such technique that provides overlap metrics, impression frequency, unique user reach and measurement performance metrics. The database service 116 goes beyond a conventional point-to-point solution by allowing for simultaneous collaboration insights that are available at browser hover speed (e.g., near real time) between a single advertiser and multiple publishers and multiple partners. Furthermore, the collaboration can span across multiple cloud providers between collaborating parties.

The database service 116 implements a compute component that is a privacy-centric, zero-data-share implementation as no entity can view or access a different entity's confidential information. Consider a scenario in which an advertiser wishes to view overlap metrics between its audience "a2" and a publisher's audience "p2." The generated sketches are "A2" from the advertiser and "P2" from the publisher, respectively. The computation may be triggered from a UI by the advertiser.

To compute and view the metrics (e.g., as a probabilistic result), the database manager module 702 performs set operations on the sketches 136 by computing the intersection between sketches to create a new result sketch. This operation is executed at browser hover speed and is executed using the probabilistic data structures 138 which do not involve sharing of confidential information 130 between the advertiser and publisher. In this example, once the result sketch, "R1" is calculated, the audience overlap count can be returned to the UI to show the value to the advertiser.

In a scenario involving an act of sharing an audience with a publisher, advertiser exploration within the database service 116 allows the user (e.g., advertiser) to share a computed audience. The resulting audience is "materialized" into a list of membership IDs using the mapping 212. Next, the materialized list of IDs is "activated" by copying them into a location specified by the publisher.

In an advertiser/publisher data onboarding and sketch generation scenario, the database service 116 supports federated access, allowing a participating entity to specify a data access point's location. In addition, each entity may use a different cloud provider. Thus, each entity onboards a corresponding dataset 124 independently from any other entity. For parties that do not have dedicated data access points or do not wish to share their data access point, these entities can also upload the dataset 124 into a dedicated blob storage.

Once the data access point location has been identified, the dataset 124 is read by the dataset manager module 122 which then generates the appropriate entity's sketches 136. The collection of sketches 136 forms an entity's database 120. The sketches are stored independent of any other entity's sketches 136.

In an insights computation scenario, for a given collaboration, insights, including discovery, are computed using set operations against each entity's sketches 136, resulting in a temporary sketch when applicable. The solution allows an entity to scale paid media campaigns across a variety of publishers. The entity can also share their own onboarded audiences or a computed audience across many publishers.

In an audience materialization and activation scenario, an entity that wishes to share an audience can trigger the materialization and activation of said audience in a publisher's protected environment. To do so, using a sketch 136 as a starting point, materialization begins by scanning the dataset 124 in a publisher's environment. The materialization process checks membership existence in the sketch for each user ID, e.g., using the mapping 212. Once each of the members of the sketch have been identified, the membership IDS are temporarily stored.

The next step is to copy the materialized list of membership IDs into a location as specified by the publisher. The location may be a blob storage or simply an audience table, to which, the Publisher grants access. The temporary list of materialized IDs is then deleted immediately after the copy is completed.

The database service 116 and database 120 implement collaboration techniques that are privacy centric by implementing zero-data-sharing of individual user level data between collaborating parties. Sketches 136 are free from individual user level data. The dataset 124 is deleted at generation of the sketch 136 by the database service 116. These techniques support a variety of operations including overlap metrics, impression frequency, unique user reach, and measurement performance metrics based on sketches 136.

The collaboration techniques support "N"-way collaboration between advertisers, publishers, ID partners and data partners. This collaboration permits advertisers to plan campaigns and view performance metrics across collaborating parties, including publishers, data partners and ID partners. These techniques also permit collaborating entities to be agnostic of the other entity's cloud-provider and technology stack, which is not possible in conventional techniques.

Change Detection and Updates using Probabilistic Data Structures

The following discussion describes change detection and update techniques that are implementable utilizing the described systems and devices through use of a probabilistic data structure. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

Conventional techniques used for digital content control and interaction are implemented directly between two entities and as such do not support multi-entity collaboration. Digital content control, for instance, is usable to generate digital content recommendations, output of emails, instant message, advertisements, and so forth. The entities, for instance, may include an advertiser, a publisher, a data/ID partner, and so forth. Therefore, collaboration in this scenario involves sharing data that identifies items of digital content that are a subject of member interaction as well as an identity of the members, themselves, e.g., through a membership ID. The data, for instance, is shared to determine performance of a digital content campaign with a corresponding publisher. However, as described above this sharing (e.g., audience and conversion data) can lead to privacy concerns that may limit and even prevent cooperation between the entities.

Additionally, conventional point-to-point collaboration limits an ability to compare performance with a plurality of corresponding entities together, e.g., multiple publishers. This limitation may prevent an ability to view optimal insights that can allow rapid changes to a campaign for a better return on investment. In another example, advertisers are tasked in conventional techniques to share data directly with data/ID partners to in turn receive enriched audience data, which may also lead to privacy concerns.

Further, conventional techniques used for digital content control may involve collaboration with multi-cloud-providers. Conventional entities are further tasked with obtaining knowledge and operational expertise to support, at scale, each other entity, with which, collaboration is desired. This technical challenge increases significantly if an entity (e.g., advertiser, publisher, or ID partner) adopts a new cloud provider, makes a change to underlying technology offering for a given collaboration, and so forth. The collaborating entities, in conventional scenarios, are therefore forced to utilize a separate implementation per cloud and per entity in a quest to execute optimal performing campaigns while sharing confidential information (e.g., user data) in a variety of non-normalized data formats.

In these conventional techniques, for instance, row level data that contains confidential information (e.g., membership ID) is shared in a repeated fashion for each entity, with which, collaboration is to be performed. Similarly, an entity (e.g., advertiser) that aims to improve match rates may wish to work with different data/ID partners and publishers. Additionally, publishers may support multiple partners.

Yet further, an advertiser may have different data access points than the publishers. Data access points, for instance, refer to an endpoint and/or technology stack, from which, a dataset is to be obtained. The technical challenge is the same across any type of data access point that an advertiser or publisher may employ, e.g., a data clean room (DCR), a customer data platform (CDP), or conversions API (CAPI-wall garden publishers), and so forth. Additional concerns involve collaboration in a privacy centric manner that are amplified as the sharing of data across parties is forced to also include a repeatable, detailed, and strict implementation to prevent data leakage.

Accordingly, in the techniques described herein a system is configured to address these and other technical challenges through use of probabilistic data structures by employing sketches. These techniques support interaction of multiple entities together through a shared environment without sharing confidential information that is maintained in a protected environment. As a result, the system supports multi-entity collaboration as opposed to conventional point-to-point collaboration. In this way, the techniques support data analysis without compromising confidential information, which is not possible in conventional techniques.

In an example involving digital content control (e.g., output of advertisements), a targeting computing device tasked with strategizing output of digital content (e.g., advertisements) may wish to enhance targeting an improve campaign performance in digital content output by a publisher computing device. A platform, for instance, used to deliver the digital content by the publisher computing device (e.g., a website, application, and so forth) may enrich data used by the targeting computing device at an individual record level by providing attributes (e.g., dimensions) for a given identity. This enrichment is based on an identity key associated with respective entities that receive the digital content, i.e., membership IDs corresponding to respective members. To do so, the targeting computing device and publisher computing device are tasked with sharing data, e.g., so that the publisher computing device returns additional information about each identity that is then usable to control digital content output.

In a scenario involving an ID partner, for instance, the ID partner is tasked with increasing a match rate of an audience associated with a targeting computing device with an audience of a publisher computing device. In this case, the ID partner finds a common partner to both the targeting computing device and the publisher computing device. The commonality occurs, for instance, at the "partner ID" level, e.g., which implements the identity key. As such, the targeting computing device in conventional examples shares confidential information (e.g., their audience data) with the ID partner to retrieve a partner ID (also referred to as a "PID") for each identity key provided by the Advertiser. Publishers are then tasked with synchronizing data to also have a corresponding Partner ID (PID) for the users when available. The sharing of data, as illustrated in both examples, however, can lead to privacy concerns as this audience data is considered confidential information.

In the techniques described herein, however, data analysis (e.g., audience expansion) is supported through use of probabilistic data structures (e.g., sketches) without sharing confidential information. The sketches, for instance, support processing within a shared environment 1104 as previously described in which the confidential information 130 is maintained in a protected environment 1102. Through use of the probabilistic data structures, data enrichment techniques may be implemented by a computing device in real time (e.g., at "hover" speed), which is not possible in conventional techniques that could take days and even weeks to perform and therefore improves computing device operation and efficiency of these computing devices.

Further these techniques may be expanded through use of collaboration supported by the sketches for multiple entities, and therefore overcome conventional one-to-one sharing limitations. As previously described, an amount of data involved in conventional techniques used for collaboration could take hours and even days to process in order to achieve a result.

In an audience discovery example, a targeting and publishing computing device collaborate by sharing data describing respective audiences to compute an overlap, e.g., a union or intersection. As such, performance of these operations is dependent on a size of the audiences and thus respective data used to describe those audiences, which typically involves a heavy use of computational resources. Usage of the computational resources, for instance, may be proportional to a cross product of a number of audiences on both sides of the collaboration, e.g., an advertiser and a publisher.

In a conventional example, entities employ respective databases, examples of which include a relation database management system (RDBMS), distributed query engine, and so forth. To employ these techniques, data is fetched at runtime and audience exploration, analysis, and measurement techniques that are then used to process this data, which is computationally expensive in practice given an amount of data typically used to describe the audiences.

Through use of sketches, however, processing time and corresponding use of computational resources is reduced. In the following discussion, techniques are further described that support further improvement to computational efficiency of sketch usage through change detection and updates to sketches maintained in a database. The change detection and update techniques, for instance, support real-time operation (e.g., "hover speed") of audience exploration, analysis, and measurement through increased efficiency in computational resource usage, which is not possible in conventional techniques.

Figure 17:
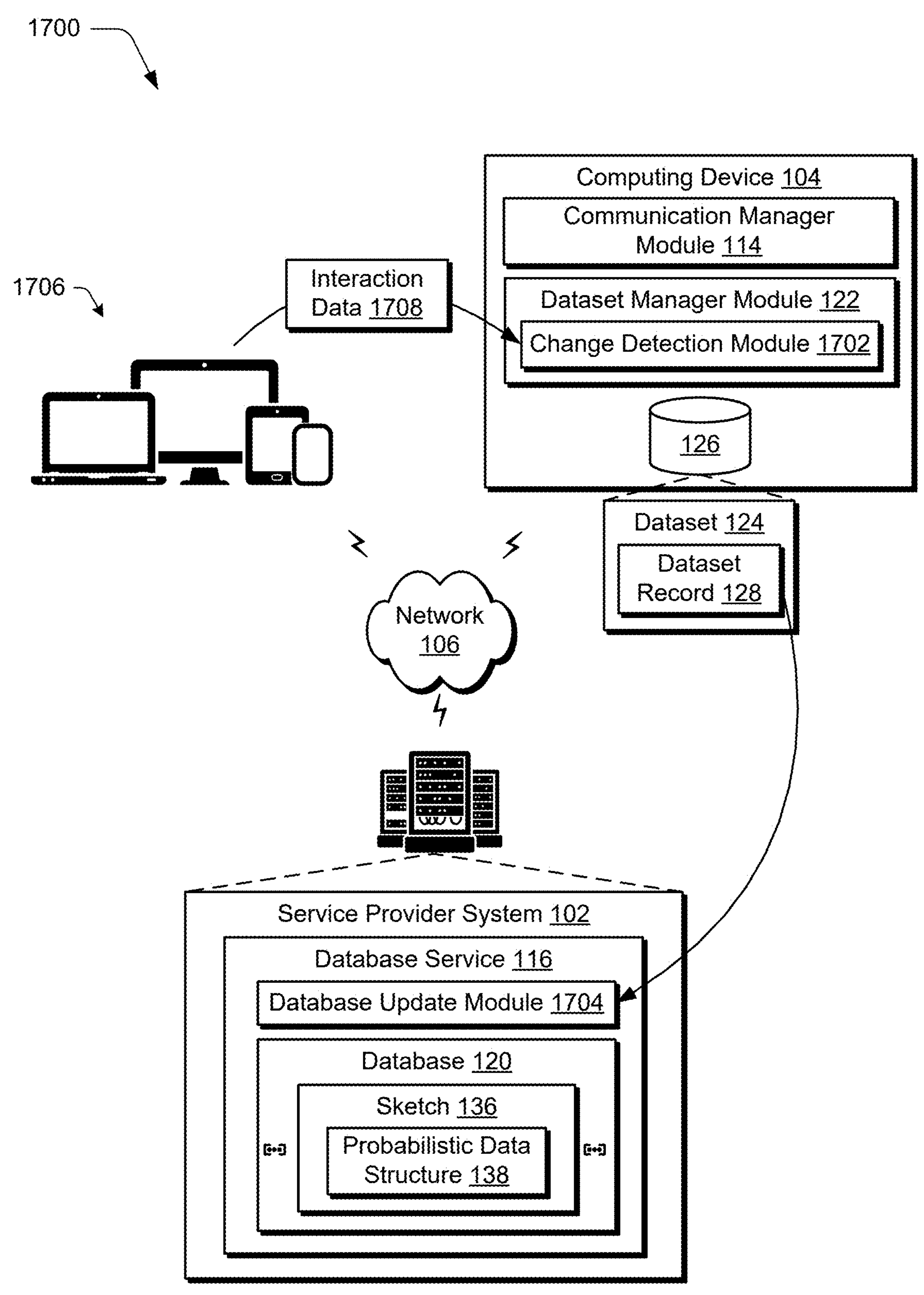
FIG. 17 depicts a system in an example implementation of change detection and updates using probabilistic data structures.

FIG. 17 depicts a system 1700 in an example implementation of change detection and updates using probabilistic data structures. In the illustrated example, a change detection module 1702 is employed by a dataset manager module 122 of a computing device 104 to detect a change to a dataset record 128 of a dataset 124. A database update module 1704 is employed by a database service 116 of the service provider system 102 to update sketches 136 in the database 120. Other examples are also contemplated as previously described, e.g., incorporation of the dataset manager module 122 locally at the service provider system 102 as part of a protected environment 1102 and use of the database update module 1704 within a shared environment 1104 as further described in relation to FIG. 18.

Client computing devices 1706, for instance, may be a subject of digital content control by the computing device 104, e.g., to target advertisements of consumers associated with the client computing devices 1706. Interaction data 1708 is then collected based on monitored interaction with the digital content, which serves as a basis to form a dataset record 128 of a dataset 124 that is used for generation of a sketch 136 as previously described.

In the techniques described herein, the change detection module 1702 is configured to detect a change in the dataset record 128 based on the interaction data 1708, e.g., as associated with a particular audience. This change is then used as a basis by the database update module 1704 to update a respective sketch 136 that is formed based on the dataset record 128 to then reflect this change. The database update module 1704, for instance, may be utilized to generate a new sketch 136 that is directly based on the dataset record 128. The database update module 1704 is also configurable to update other sketches 136 in the database 120 that are formed based on that sketch, e.g., to define audience overlaps through operations performed using a plurality of sketches.

Figure 18:
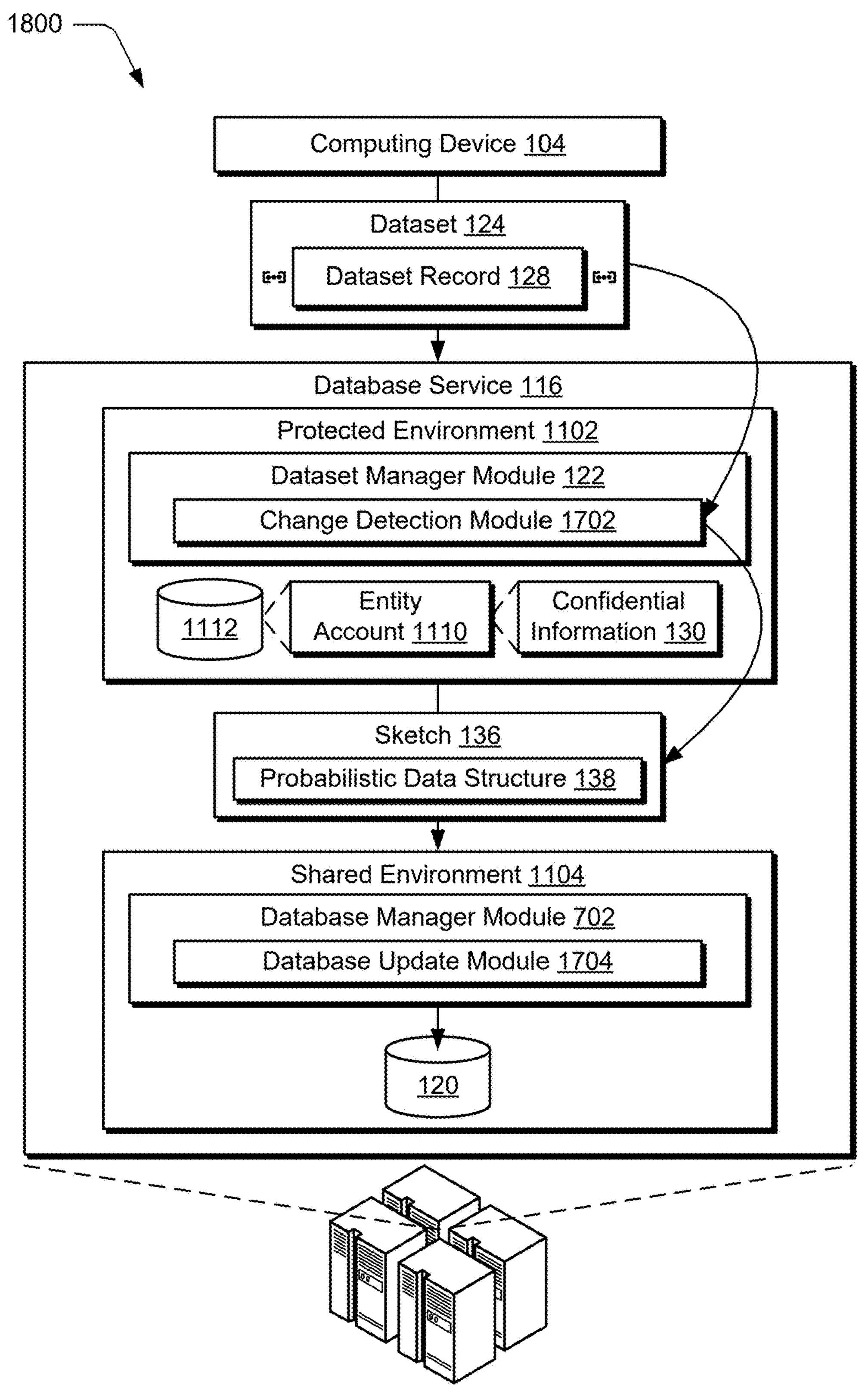
FIG. 18 depicts a system in an example implementation of change detection and updates using probabilistic data structures utilizing protected and shared environments.

FIG. 18 depicts a system 1800 in an example implementation of change detection and updates using probabilistic data structures utilizing protected and shared environments. In this example, the dataset manager module 122 is executed within a protected environment 1102 and obtains a dataset record 128 of a dataset 124, e.g., at a specified point in time from a data access point (e.g., API) associated with the computing device 104. The change detection module 1702 is executed within the protected environment 1102 to detect the change and generate a corresponding sketch 136 while maintaining confidential information 130 within the protected environment 1102.

The sketch 136, once generated as "clean" of the confidential information 130, is communicated to a database manager module 702 within a shared environment 1104. The database update module 1704 then updates the database 120, e.g., by replacing a previous sketch generated based on the dataset record 128 with the sketch 136 that is generated to reflect the change. The database update module 1704 is also configurable to update other sketches in the database 120 that are dependent on that sketch 136, e.g., to define audience overlaps. In this way, the confidential information 130 is maintained as protected within the protected environment 1102 and yet real-time operation is supported for operations performed involving the database 120, such as to perform a union operation, an intersect operation, and so forth.

In this way as described in relation to FIGS. 17 and 18, the change detection module 1702 and the database update module 1704 implement a system for indexing a dataset record 128 of a dataset 124 into sketches 136 responsive to changes to the underlying data of the dataset 124. The database update module 1704 is also configurable to implement incremental sketch generation through calculating which sketches in the database 120 that are formed from this sketch are to be updated also based on this change. In this way, the detection of changes and updates to respective sketches supports real-time implementation of operations 816 via a user interface, e.g., to view audience overlaps at "hover speed."

As previously described, a sketch 136 serves as a basis for audience analysis. The sketch 136 is independent of (i.e., does not include) confidential information 130 while maintaining data associated with the confidential information. To do so, a sketch 136 employs a probabilistic data structure that is used to represent data in a condensed form.

Sketches 136, for instance, employ algorithms (e.g., a Bloom filter, a Theta Sketch, or a MinHash), that support data representation without storing row-level information containing the confidential information 130, which ensures privacy by eliminating use of user identities, user audiences, or other confidential information. By storing a sketch 136 independent of row-level data, recovery of a corresponding user, entity, or other confidential information associated with the data is not possible. Thus, a database 120 having probabilistic data structures (e.g., the sketch) does not support direct identification of the confidential information. As a result, these techniques support compliance with privacy regulations and eliminate a risk of data leakage.

Sketches 136 are also configurable to represent data in a highly condensed form, thereby reducing an amount of data that is stored and processed. This efficiency supports faster query execution and efficient use of computational resources. Conventional queries that could take days to process by a computing device (e.g., set operations), for instance, are performable in real time using the techniques described herein.

To begin in this example, a dataset 124 is received from a respective entity associated with the computing device 104 that describes a respective audience. Sketches 136 are then generated by a dataset manager module 122 as probabilistic data structures 138. The sketches 136, in one or more examples, are configured to remove confidential information 130 (e.g., membership identifiers) and incorporate attributes and corresponding identity keys. The probabilistic data structure 138, for instance, is based on the identity key 208 and the attribute 132 and is independent of the membership ID 206. Further, the attributes 132 in these examples are not sampled through use of the probabilistic data structure 138, but rather included in their entirety thereby improving accuracy over conventional techniques.

Use of the shared environment 1104 by the database service 116 supports expanded collaboration and therefore expanded opportunities for data enrichment and identity translation by supporting collaboration between three or more entities as opposed to conventional one-on-one interactions. The database manager module 702, for instance, is configurable to detect with identity keys are included in respective sketches 136 returned as a result a processing a query and identify respective entities that correspond to those identity keys. Confidential information may then be resolved within respective protected environments 1102 associated with the detected entities, thereby protecting this information from compromise by malicious parties and improved operational and computational efficiency.

In this way, each entity (e.g., associated with the computing device 104) contributes a set of identifiers and associated audiences, which are indexed into one or more sketches 136 as associated with the entity through a respective entity account 1110. The sketches 136 are stored (e.g., persisted) by the database manager module 702 within the database 120. The database update module 1704, for instance, replaces a previous sketch that was generated based on the dataset record 128 as well as one or more other sketches that are based on that previous sketch, e.g., to define audience overlaps.

Figure 19:
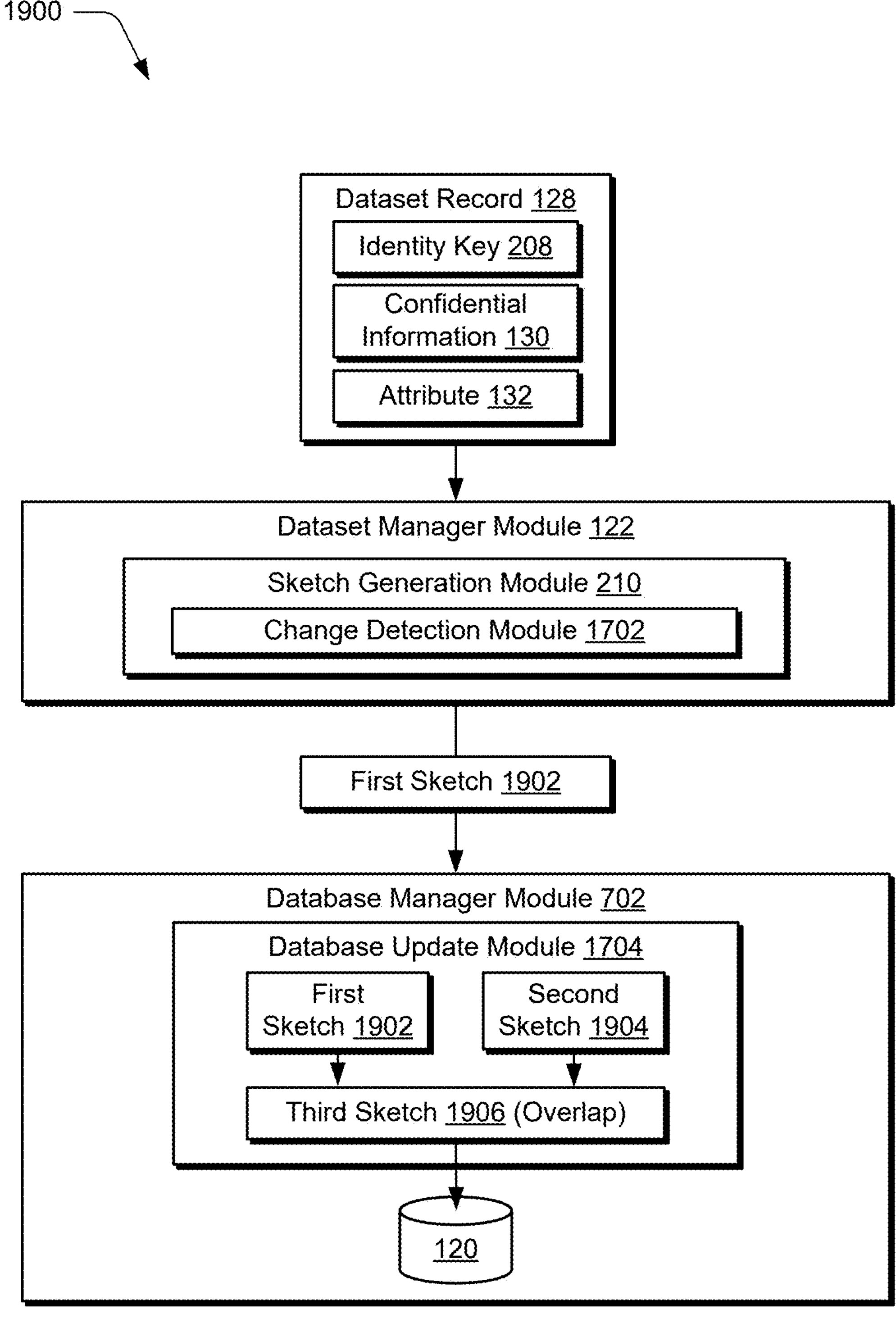
FIG. 19 depicts a system in an example implementation of change detection and updates using probabilistic data structures to update directly generated sketches based on a change to a dataset record as well as one or more other sketches that are generated based on that sketch.

FIG. 19 depicts a system 1900 in an example implementation of change detection and updates using probabilistic data structures to update directly generated sketches based on a change to a dataset record as well as one or more other sketches that are derived based on that sketch. In this example, a dataset record 128 having an identity key 208, confidential information 130, and attribute 132 is obtained by the dataset manager module 122, e.g., as an upload, download from a data access point (e.g., API), and so forth.

A change detection module 1702 of the dataset manager module 122 then detects that the dataset record 128 exhibits a change, which in this instance is a change to an underlying audience of membership IDs described by the dataset record 128, e.g., as part of a dataset 124. In response, the sketch generation module 210 is tasked generating a first sketch 1902 as previously described, e.g., by the computing device 104 and/or within the protected environment 1102 of the database service 116 at the service provider system 102. As a result, the confidential information 130 associated with the dataset record 128 is not exposed.

The first sketch 1902 is then used by the database update module 1704 of the database manager module 702 to replace a previous sketch that was based on the dataset record 128, e.g., for a same audience. The database update module 1704 also locates another sketch in the database 120 that was based on that previous sketch.

The dataset record 128, for instance, may describe an audience associated with a targeting computing device (e.g., advertiser) and therefore the previous sketch is generated as describing that audience. A second sketch 1904 is also included in the database 120 that describes an audience associated with a publisher computing device. The previous sketch and the second sketch are therefore used to generate an overlap sketch that describes an overlap of these audiences, e.g., using a union operation, an intersect operation, and so forth.

Therefore, in this example the change to the audience of the targeting computing device also has an effect on the sketch describing this overlap. Therefore, the database update module 1704 is employed to "update" the overlap sketch by generating a third sketch 1906. The update, for instance, is formed as an overlap using the first sketch 1902 that describes the change to the audience of the targeting computing device with the second sketch 1904 describing the audience of the publishing computing device to form a "new" third sketch 1906 describing the overlap. As a result, the third sketch 1906 is usable to support real-time output (e.g., at "hover speed") to show audience overlaps in a user interface, which is not possible in conventional techniques. Further, these techniques may be performed incrementally as changes are detected, thereby keeping sketches of the database 120 current.

FIGS. 20, 21, and 22 depict examples 2000, 2100, 2200 of operations performed by the database 120 that support real time output in a user interface. Visualization of an overlap between audiences of two entities may be addressed as an "N×M" matrix as shown in FIG. 20. Each cell in the matrix represents an overlap (e.g., union or intersection) between an advertiser audience and a respective publisher audience in the illustrated example.

In conventional techniques used to compute an overlap between the audiences, "N×M" queries are generated such that a query is generated for each of the cells in the matrix at runtime. A cross product is then precomputed between the audience ID and identifier pairs of both sides of the collaboration between the advertiser and the publisher which is proportional to a number of audiences multiplied by an average number of identifiers within each audience, which involves a prohibitively expensive use of computational resources.

However, through use of the probabilistic data structures of the sketches as described herein, each of the audiences is reduced into a respective sketch. Accordingly, a snapshot calculation for cells of the matrix of FIG. 20 is performable as a "cross join" between sketches used to represent respective audiences of the advertiser and publisher, an example of which is described as follows:

For each adv-sketch (identity key) in (advertiser audience 1, advertiser audience 2, . . . )
  For each pub-sketch (identity key) in (publisher audience 1, publisher audience 2, . . . )
    Emit adv-sketch.intersect(pub-sketch).

Sketches generated describing the resulting intersections are then stored in the database 120 against respective identity keys (e.g., audience IDs), as shown in the example 2100 of FIG. 21.

At each change and/or predefined interval of time that exhibits a change, the database update module 1704 is configured to track newly modified audiences in this example. Because the emitted overlap matrix of FIG. 20 is stored in the database 120 (i.e., persisted), the database update module 1704 may then employ an indexing technique to update sketches for cells of the matrix that are affected by the change. In other words, the database update module 1704 is configured to update rows or columns of the matrix that are modified based on the change.

The database update module 1704, for instance, is configurable to detect whether to update a respective sketch based on a signature associated with a respective sketch and a bit pattern that is deterministic given the input (e.g., the dataset record 128) used to generate the sketch as described above. The database update module 1704, for instance, employs an "isSimilar" function to detect this change and perform updates accordingly.

In an example 2200 of FIG. 22, for instance, a change is detected for "advertiser audience 4", and therefore the database update module 1704 determines that updates are to be generated by generating "new" sketches for intersections involving that audience for cells of the matric, which are illustrated as including a word "update." To do so, the database update module 1704 may implement a modified technique for incremental sketch updates as follows:

For each identity key in (identity-key1, identity-key2, . . . )
  For each adv-sketch (identity key) in (advertiser audience 1, advertiser audience 2, . . . )
    If adv-sketch(identity key).isSimilar(adv-sketch-old (identitykey))==1;
Skip Processing
  For each pub-sketch (identity key) in (publisher audience 1, publisher audience 2, . . . )
    If pub-sketch(identity key).isSimilar(pub-sketch-old (identitykey))==1;
Skip Processing
    Emit adv-sketch.intersect(pub-sketch).

Figure 23:
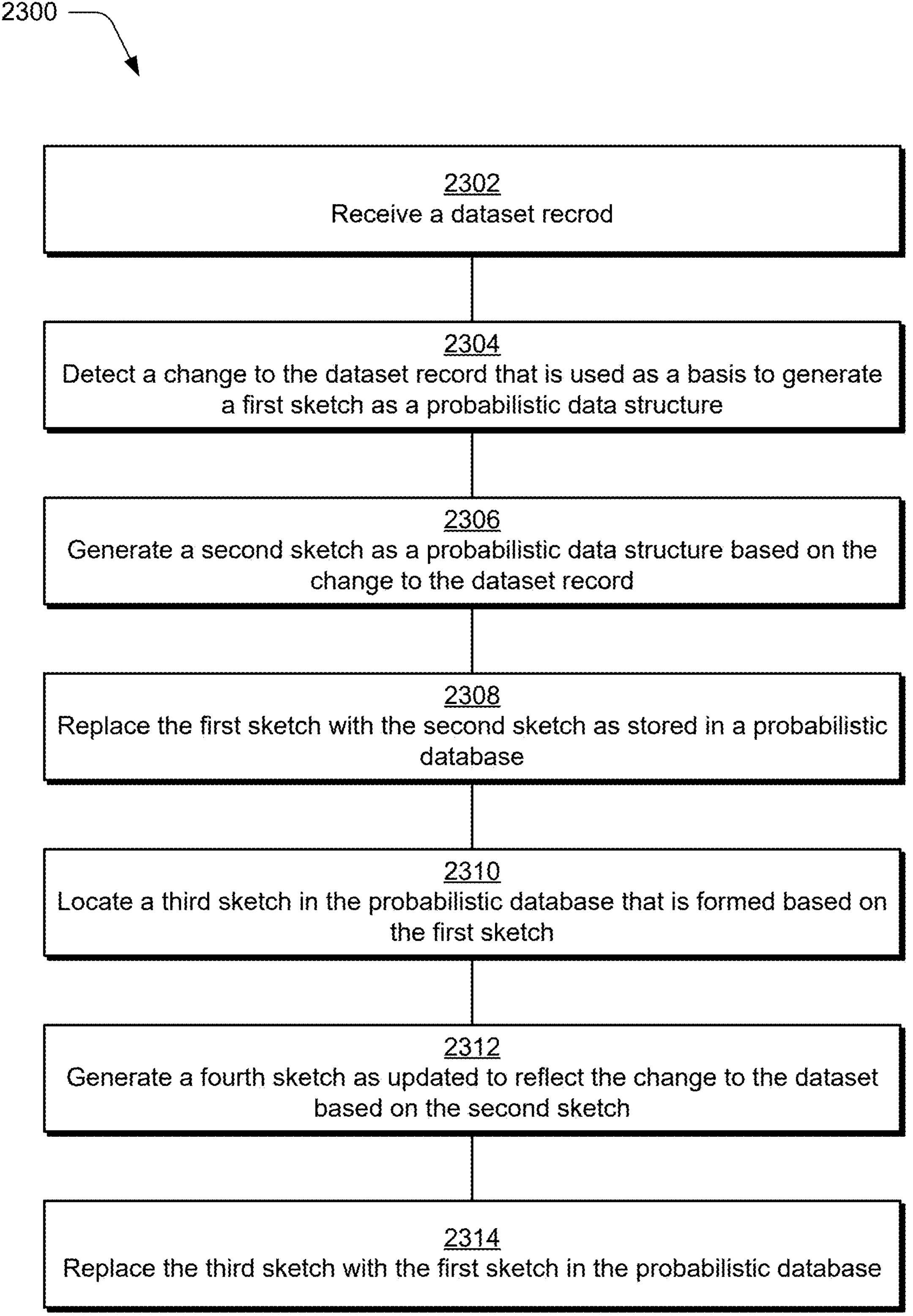
FIG. 23 is a flow diagram depicting an algorithm as a step-by-step procedure in an example implementation of operations performable for accomplishing a result of change detection and updates using probabilistic data structures.

Once the overlap matrix is incrementally maintained, the database update module 1704 is configured to efficiently sort min/max overlaps across dimensions of the matrix. If additional dimensions (e.g., audience category) exist in a different table, the additional dimensions may be augmented with overlap numbers by offering recommendations, similarity scores, and filtering capabilities in real time due to a reduction in operation complexity, FIG. 23 is a flow diagram depicting an algorithm 2300 as a step-by-step procedure in an example implementation of operations performable for accomplishing a result of change detection and updates using probabilistic data structures. To begin in this example, a dataset record is received (block 2302). A change is detected to the dataset record that is used as a basis to generate a first sketch as a probabilistic data structure (block 2304). The first sketch, for instance, is maintained in the database 120.

A second sketch is generated as a probabilistic data structure based on the change to the dataset record (block 2306). The first sketch is stored in the database is replaced with the second sketch (block 2308). A third sketch is located in the probabilistic data that is formed based on the first sketch (block 2310), e.g., for an overlap. A fourth sketch is then generated as updated to reflect the change to the dataset based on the second sketch (block 2312), e.g., as an overlap operation with a fifth sketch describing another audience. The third sketch is then replaced with the first sketch in the database (block 2314), which may support subsequent operations and output of results in real time, which is not possible in conventional techniques.

FIG. 24 is a flow diagram depicting an algorithm 2400 as a step-by-step procedure in another example implementation of operations performable for accomplishing a result of change detection and updates using probabilistic data structures. A first sketch of a plurality of sketches is detected as inaccurate due to a change to a dataset record that is used as a basis to generate the first sketch as a probabilistic data structure (block 2402).

Second and third sketches are generated as probabilistic data structures based on the change to the dataset record as database replacements in a database (block 2404). The second sketch is generated directly based on the change to the dataset record (block 2406), e.g., from the changed dataset record itself. The third sketch is generated based on the second sketch (block 2408), e.g., using an intersect or union operation. A variety of other examples are also contemplated.

Example System and Device

Figure 25:
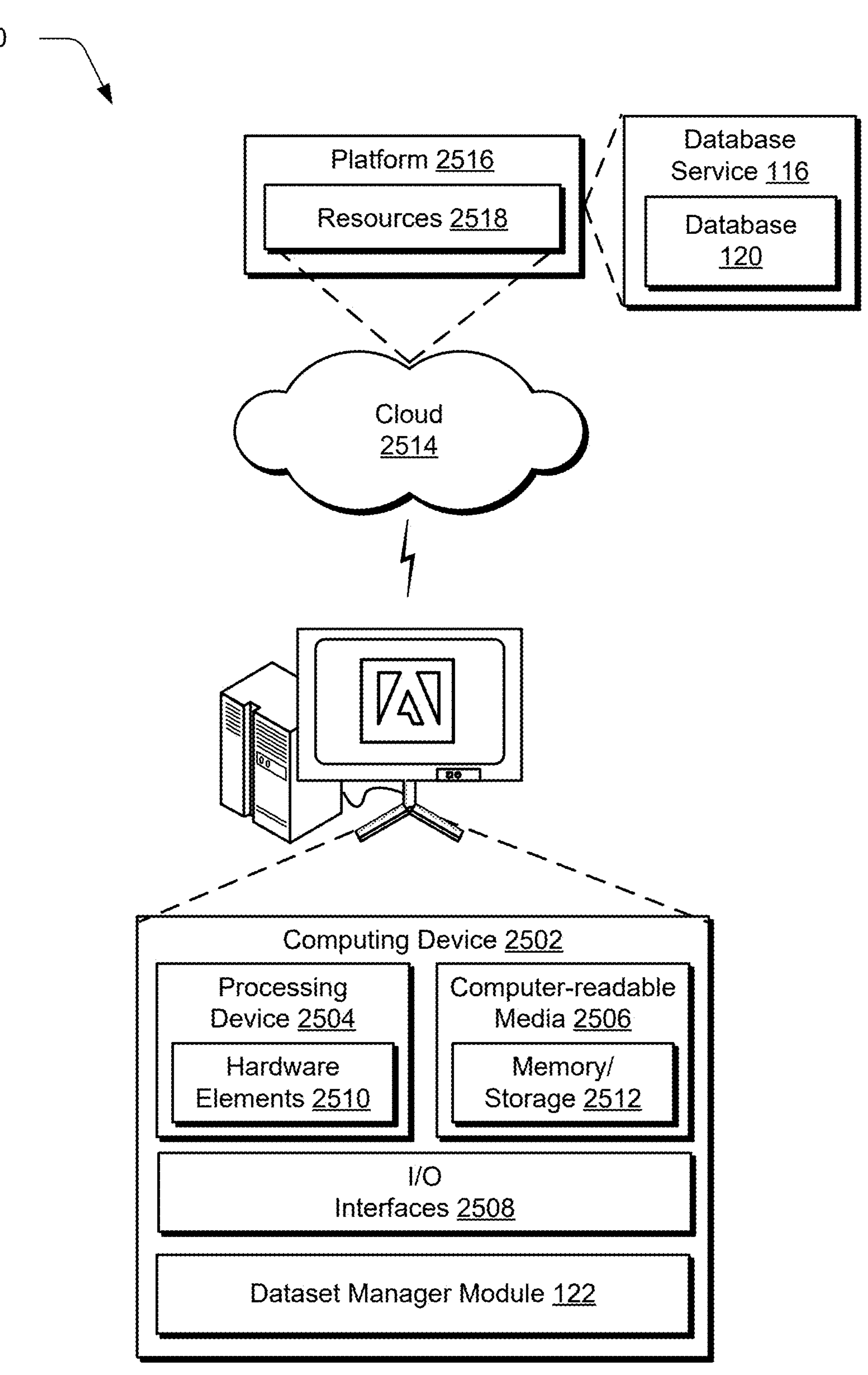
FIG. 25 illustrates an example system that includes an example computing device that is representative of one or more computing systems and/or devices that implement the various techniques described herein.

FIG. 25 illustrates an example system generally at 2500 that includes an example computing device 2502 that is representative of one or more computing systems and/or devices that implement the various techniques described herein. This is illustrated through inclusion of the database service 116, the database having probabilistic data structures 138, and the dataset manager module 122. The computing device 2502 is configurable, for example, as a server of a service provider, a device associated with a client (e.g., a client device), an on-chip system, and/or any other suitable computing device or computing system.

The example computing device 2502 as illustrated includes a processing device 2504, one or more computer-readable media 2506, and one or more I/O interface 2508 that are communicatively coupled, one to another. Although not shown, the computing device 2502 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 2504 is representative of functionality to perform one or more operations using hardware. Accordingly, the processing device 2504 is illustrated as including hardware element 2510 that is configurable as processors, functional blocks, and so forth. This includes implementation in hardware as an application specific integrated circuit or other logic device formed using one or more semiconductors. The hardware elements 2510 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 2506 is illustrated as including memory/storage 2512 that stores instructions that are executable to cause the processing device 2504 to perform operations. The computer-readable storage medium is configured for storing instructions that, responsive to execution by the processing device, causes the processing device to perform operations. The memory/storage 2512 represents memory/storage capacity associated with one or more computer-readable media. The memory/storage 2512 includes volatile media (such as random access memory (RAM)) and/or nonvolatile media (such as read only memory (ROM), Flash memory, optical disks, magnetic disks, and so forth). The memory/storage 2512 includes fixed media (e.g., RAM, ROM, a fixed hard drive, and so on) as well as removable media (e.g., Flash memory, a removable hard drive, an optical disc, and so forth). The computer-readable media 2506 is configurable in a variety of other ways as further described below.

Input/output interface(s) 2508 are representative of functionality to allow a user to enter commands and information to computing device 2502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2502 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 2502. By way of example, and not limitation, computer-readable media includes "computer-readable storage media" and "computer-readable signal media." "Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 2502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2510 and computer-readable media 2506 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 2510. The computing device 2502 is configured to implement particular instructions and/or functions corresponding to the software and/or hardware modules. Accordingly, implementation of a module that is executable by the computing device 2502 as software is achieved at least partially in hardware, e.g., through use of computer-readable storage media and/or hardware elements 2510 of the processing device 2504. The instructions and/or functions are executable/operable by one or more articles of manufacture (for example, one or more computing devices 2502 and/or processing devices 2504) to implement techniques, modules, and examples described herein.

The techniques described herein are supported by various configurations of the computing device 2502 and are not limited to the specific examples of the techniques described herein. This functionality is also implementable all or in part through use of a distributed system, such as over a "cloud" 2514 via a platform 2516 as described below.

The cloud 2514 includes and/or is representative of a platform 2516 for resources 2518. The platform 2516 abstracts underlying functionality of hardware (e.g., servers) and software resources of the cloud 2514. The resources 2518 include applications and/or data that can be utilized while computer processing is executed on servers that are remote from the computing device 2502. Resources 2518 can also include services provided over the Internet and/or through a subscriber network, such as a cellular or Wi-Fi network.

The platform 2516 abstracts resources and functions to connect the computing device 2502 with other computing devices. The platform 2516 also serves to abstract scaling of resources to provide a corresponding level of scale to encountered demand for the resources 2518 that are implemented via the platform 2516. Accordingly, in an interconnected device embodiment, implementation of functionality described herein is distributable throughout the system 2500. For example, the functionality is implementable in part on the computing device 2502 as well as via the platform 2516 that abstracts the functionality of the cloud 2514.

In implementations, the platform 2516 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

detecting, by a processing device, a change to a dataset record that is used as a basis to generate a first sketch as a probabilistic data structure, the dataset record including confidential information associated with a membership identifier that is configured to identify a particular entity associated with the confidential information;

generating, by the processing device, a second sketch as a probabilistic data structure based on the change to the dataset record, the second sketch configured such that direct identification of the confidential information as associated with the membership identifier of the particular entity is not supported;

replacing, by the processing device, the first sketch with the second sketch as stored in a database, the database supporting a probabilistic result to a query operation; and forming, by the processing device, a mapping of the confidential information included in the dataset record to the second sketch, the second sketch is configured to be stored independent of the confidential information.

2. The method as described in claim 1, further comprising:

locating a third sketch in the database, the third sketch formed based at least in part on the first sketch;

generating a fourth sketch as updated to reflect the change to the dataset record based on the second sketch; and replacing the third sketch with the fourth sketch in the database.

3. The method as described in claim 2, wherein the third sketch is generated based on the first sketch and a fifth sketch and the fourth sketch is generated based on the second sketch and the fifth sketch.

4. The method as described in claim 3, further comprising wherein the third sketch and the fourth sketch are formed using a union operation or an intersect operation.

5. The method as described in claim 2, further comprising:

forming a query for processing by the database; and receiving a probabilistic result to the query from the database based on the fourth sketch in real time.

6. The method as described in claim 1, wherein the dataset record includes an identity key, a respective attribute, and the confidential information.

7. The method as described in claim 6, wherein the first sketch, as stored in the database, does not support direct identification of the confidential information via the database.

8. The method as described in claim 6, wherein the confidential information is a membership identifier (ID) of a respective entity associated with the attribute for the identity key.

9. The method as described in claim 6, further comprising:

forming a query for processing by the database;

receiving a probabilistic result to the query from the database; and resolving a sketch, as included in the probabilistic result, to the confidential information based on a mapping, the resolved sketch based at least in part on the second sketch.

10. The method as described in claim 1, wherein the mapping is configured to resolve the second sketch, as included in the probabilistic result, to the confidential information.

11. The method as described in claim 1, wherein the detecting and the generating are performed in a protected environment and replacing is performed in a shared environment.

12. A computing device comprising:

a processing device; and a computer-readable storage medium storing instruction that, responsive to execution by the processing device, causes the processing device to perform operations including:

detecting a change to a dataset record that is used as a basis to generate a first sketch as a probabilistic data structure, the dataset record including an identity key, a respective attribute, and confidential information associated with a membership identifier that is configured to identify a particular entity associated with the confidential information;

generating a second sketch as a probabilistic data structure based on the change to the dataset record, the second sketch configured such that direct identification of the confidential information as associated with the membership identifier of the particular entity is not supported; and replacing the first sketch with the second sketch as stored in a database, the database supporting a probabilistic result to a query operation;

forming a query for processing by the database;

receiving a probabilistic result to the query from the database; and resolving a sketch, as included in the probabilistic result, to the confidential information based on a mapping, the resolved sketch based at least in part on the second sketch.

13. The computing device as described in claim 12, further comprising forming a mapping of confidential information included in the dataset record to the second sketch and wherein the second sketch is configured to be stored independent of the confidential information.

14. The computing device as described in claim 13, wherein the mapping is configured to resolve the second sketch, as included in the probabilistic result, to the confidential information.

15. The computing device as described in claim 12, wherein the detecting and the generating are performed in a protected environment and replacing is performed in a shared environment.

16. A computing device comprising:

a processing device; and a computer-readable storage medium storing instruction that, responsive to execution by the processing device, causes the processing device to perform operations including:

detecting a change to a dataset record that is used as a basis to generate a first sketch as a probabilistic data structure, the dataset record including confidential information associated with a membership identifier that is configured to identify a particular entity associated with the confidential information;

generating a second sketch as a probabilistic data structure based on the change to the dataset record, the second sketch configured such that direct identification of the confidential information as associated with the membership identifier of the particular entity is not supported; and replacing the first sketch with the second sketch as stored in a database, the database supporting a probabilistic result to a query operation;

forming a mapping of confidential information included in the dataset record to the second sketch, the second sketch configured to be stored independent of the confidential information.

17. The computing device as described in claim 16, wherein the mapping is configured to resolve the second sketch, as included in the probabilistic result, to the confidential information.

18. The computing device as described in claim 17, wherein the dataset record includes an identity key, a respective attribute, and the confidential information.

19. The computing device as described in claim 18, further comprising:

forming a query for processing by the database;

receiving a probabilistic result to the query from the database; and resolving a sketch, as included in the probabilistic result, to the confidential information based on a mapping, the resolved sketch based at least in part on the second sketch.

* * * * *